(12) United States Patent
Sheng

(10) Patent No.: US 11,270,502 B2
(45) Date of Patent: Mar. 8, 2022

(54) METHOD AND APPARATUS FOR IMAGE PROCESSING OF THREE-DIMENSIONAL MODEL MAPS

(71) Applicant: Alibaba Group Holding Limited, Grand Cayman (KY)

(72) Inventor: Xiaojie Sheng, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 16/632,618

(22) PCT Filed: Jul. 11, 2018

(86) PCT No.: PCT/CN2018/095220
§ 371 (c)(1),
(2) Date: Jan. 21, 2020

(87) PCT Pub. No.: WO2019/037558
PCT Pub. Date: Feb. 28, 2019

(65) Prior Publication Data
US 2020/0202619 A1  Jun. 25, 2020

(30) Foreign Application Priority Data

Aug. 22, 2017 (CN) .......................... 201710726124.1
Mar. 2, 2018 (CN) .......................... 201810176125.8

(51) Int. Cl.
*G06T 17/10* (2006.01)
*G06T 19/20* (2011.01)

(52) U.S. Cl.
CPC .............. *G06T 17/10* (2013.01); *G06T 19/20* (2013.01); *G06T 2200/04* (2013.01); *G06T 2219/2021* (2013.01)

(58) Field of Classification Search
None
See application file for complete search history.

(56) References Cited

U.S. PATENT DOCUMENTS 5,651,104 A  7/1997 Cosman
7,002,591 B1  2/2006 Leather et al.
(Continued)

FOREIGN PATENT DOCUMENTS

CN  103635939 A  3/2014
CN  106534974 A  3/2017
(Continued)

OTHER PUBLICATIONS

International Search Report to corresponding International Application No. PCT/CN2018/095220 dated Oct. 24, 2018 (2 pages).
(Continued)

*Primary Examiner* — Jason A Pringle-Parker
(74) *Attorney, Agent, or Firm* — James J. DeCarlo; Greenberg Traurig LLP

(57) ABSTRACT

The disclosed embodiments relate to image processing methods and apparatuses. In one embodiment, a method includes: mapping an inputted three-dimensional (3D) model map into an asymmetric cubemap, the asymmetric cubemap located at a different place than the mapping center of the inputted 3D model map; and stretching the asymmetric cubemap mapped for the inputted 3D model map into a two-dimensional (2D) stretched plane map. Since the asymmetric cubemap is located at a different place than the mapping center of the inputted 3D model map, after the inputted 3D model map is mapped into the asymmetric cubemap and stretched into a 2D plane, the image resolution can be maintained in one face of the asymmetric cubemap and the image resolution can be reduced in other faces, so that high image resolution in an ROI of a user can be maintained, and the resolution of regions away from the ROI can slowly decrease, thereby lowering the overall resolution of the 2D stretched plane map and reducing the amount of data for subsequent processing.

20 Claims, 25 Drawing Sheets

(56) References Cited

U.S. PATENT DOCUMENTS

| | | |
|---|---|---|
| 7,307,638 B2 | 12/2007 | Leather et al. |
| 7,339,593 B1 | 3/2008 | Donovan et al. |
| 7,474,776 B2 | 1/2009 | Kaufman et al. |
| 7,586,496 B1 | 9/2009 | Donovan et al. |
| 7,719,544 B2 | 5/2010 | Boyd et al. |
| 7,884,830 B1* | 2/2011 | Green .................. G06T 15/04 345/582 |
| 8,274,517 B2 | 9/2012 | Boyd et al. |
| 8,305,381 B2 | 11/2012 | Boyd et al. |
| 10,812,833 B2 | 10/2020 | Zhu et al. |
| 2001/0031920 A1 | 10/2001 | Kaufman et al. |
| 2002/0126129 A1 | 9/2002 | Snyder et al. |
| 2005/0122331 A1 | 6/2005 | Boyd et al. |
| 2005/0122332 A1 | 6/2005 | Boyd et al. |
| 2005/0122334 A1 | 6/2005 | Boyd et al. |
| 2005/0140694 A1 | 6/2005 | Subramanian et al. |
| 2012/0212491 A1 | 8/2012 | Hager |
| 2014/0152699 A1 | 6/2014 | Oh |
| 2015/0248916 A1 | 9/2015 | Kopf et al. |
| 2015/0321103 A1* | 11/2015 | Barnett .................. A63F 13/63 345/419 |
| 2016/0142697 A1 | 5/2016 | Budagavi et al. |
| 2016/0148413 A1 | 5/2016 | Oh |
| 2017/0094262 A1* | 3/2017 | Peterson ............... G06T 19/006 |
| 2017/0104927 A1* | 4/2017 | Mugavero ............. G06F 3/012 |
| 2017/0244948 A1 | 8/2017 | Pang et al. |
| 2017/0280126 A1* | 9/2017 | Van der Auwera ... G06T 3/0062 |
| 2018/0197338 A1* | 7/2018 | Crispin .................. G06T 15/10 |
| 2019/0158815 A1* | 5/2019 | He ....................... H04N 19/597 |
| 2020/0177925 A1 | 6/2020 | Zhu et al. |

FOREIGN PATENT DOCUMENTS

| | | |
|---|---|---|
| CN | 106651764 A | 5/2017 |
| CN | 106875331 A | 6/2017 |

OTHER PUBLICATIONS

Manson et al., "Fast Filtering of Reflection Probes," Computer Graphics Forum: Journal of the European Association for Computer Graphics, vol. 35, No. 4, pp. 119-127 (2016).

Extended EP Search Report to corresponding EP Application No. 18847857 dated May 25, 2021 (9 pages).

* cited by examiner

METHOD AND APPARATUS FOR IMAGE PROCESSING OF THREE-DIMENSIONAL MODEL MAPS

CROSS-REFERENCE TO RELATED APPLICATIONS

This application is a National Stage of International Application No. PCT/CN18/95220, filed Jul. 11, 2018, which claims priority to Chinese Patent Application No. 201810176125.8 filed Mar. 2, 2018, and Chinese Patent Application No. 201710726124.1 filed Aug. 22, 2017, all of which are incorporated by reference in their entirety.

BACKGROUND

Technical Field

The present disclosure relates to the field of image processing technologies and, in particular, to methods and apparatuses for image processing.

Description of the Related Art

Before video encoding, a panoramic video may be mapped and stretched using models such as an equirectangular projection model, a cubemap model, or a pyramid model.

An equirectangular model is a model of sphere mapping. An image obtained after mapping using the equirectangular model has an overly large area, resulting in a high bit rate of subsequent transcoding. As compared with the equirectangular model, mapping using a cubemap model can completely maintain pixels of a panoramic video and can reduce the area of an encoded image after mapping, reducing the bit rate of subsequent video encoding.

However, existing cubemap mapping techniques are symmetric and cannot improve the compression quality of a current region of interest (ROI). Pyramid mapping is often used to solve this problem. With the approach of pyramid mapping and stretching, different images from different primary fields of view of a user's viewing are obtained. Each mapped image channel has the sharpest resolution from a certain primary field of view of the user. The mapping resolution decreases at positions away from the primary field of view of the user. Therefore, with the approach of pyramid mapping and stretching, a mapped and stretched image having low resolution on each channel of a mapped image can be obtained. In general, a jaggy effect occurs when the field of view of the user departs from the primary field of view by about 70 degrees, and the image quality will become unacceptable when the field of view of the user departs from the primary field of view by 180 degrees.

As a result, in mapping and stretching using the pyramid model, although the compression quality of the ROI can be improved, the image quality of regions away from the ROI quickly deteriorates.

SUMMARY

The present disclosure provides an image processing method and apparatus remedying the aforementioned deficiencies.

According to one aspect of the disclosure, an image processing method based on a cubemap is provided, comprising: mapping an inputted three-dimensional (3D) model map into an asymmetric cubemap, the asymmetric cubemap located at a different place than the mapping center of the inputted 3D model map; and stretching the asymmetric cubemap mapped for the inputted 3D model map into a two-dimensional (2D) stretched plane map.

In one implementation, the mapping an inputted 3D model map into an asymmetric cubemap comprises: performing mapping from the center of the asymmetric cubemap so that pixels on a surface of the inputted 3D model map correspond to pixels on a surface of the asymmetric cubemap, the inputted 3D model map being an ordinary cubemap, and the asymmetric cubemap located at a different place than the mapping center of the ordinary cubemap.

In one implementation, the mapping an inputted 3D model map into an asymmetric cubemap further comprises: performing mapping from the center of the ordinary cubemap so that pixels on a surface of the inputted 3D model map correspond to pixels on a surface of the ordinary cubemap, the inputted 3D model map being a sphere model, and the ordinary cubemap located at the same place as the mapping center of the sphere model; and performing mapping from the center of the asymmetric cubemap so that the pixels on the surface of the ordinary cubemap correspond to pixels on a surface of the asymmetric cubemap, the asymmetric cubemap located at a different place than the mapping center of the ordinary cubemap.

In one implementation, the mapping an inputted 3D model map into an asymmetric cubemap comprises: performing mapping from the center of the asymmetric cubemap so that pixels on a surface of the inputted 3D model map correspond to pixels on a surface of the asymmetric cubemap, the inputted 3D model map being a sphere model, and the asymmetric cubemap located at a different place than the mapping center of the sphere model.

In one implementation, the stretching the asymmetric cubemap mapped for the inputted 3D model map into a 2D stretched plane map comprises: making the pixels on the surface of the asymmetric cubemap correspond to pixels of the 2D stretched plane map.

In one implementation, the method further comprises: determining a first mapping relationship between 3D coordinates of the ordinary cubemap and 3D coordinates of the asymmetric cubemap according to an offset between the asymmetric cubemap and the mapping center of the ordinary cubemap; and determining a second mapping relationship between the 3D coordinates of the asymmetric cubemap and 2D coordinates of the 2D stretched plane map according to the offset between the asymmetric cubemap and the mapping center of the ordinary cubemap.

In one implementation, the method further comprises: determining a third mapping relationship between polar coordinates of the sphere model and 3D coordinates of the ordinary cubemap; determining a first mapping relationship between the 3D coordinates of the ordinary cubemap and 3D coordinates of the asymmetric cubemap according to an offset between the asymmetric cubemap and the mapping center of the ordinary cubemap; and determining a second mapping relationship between the 3D coordinates of the asymmetric cubemap and 2D coordinates of the 2D stretched plane map according to the offset between the asymmetric cubemap and the mapping center of the ordinary cubemap.

In one implementation, the method further comprises: determining a fourth mapping relationship between 3D coordinates of the asymmetric cubemap and polar coordinates of the sphere model according to an offset between the asymmetric cubemap and the mapping center of the sphere model; and determining a fifth mapping relationship between the 3D coordinates of the asymmetric cubemap and 2D coordinates of the 2D stretched plane map according to the offset between the asymmetric cubemap and the mapping center of the sphere model.

According to another aspect of the disclosure, an image processing method is provided, comprising: mapping an inputted three-dimensional (3D) model map into an asymmetric sphere model, the asymmetric sphere model located at a different place than the mapping center of the inputted 3D model map; and stretching the asymmetric sphere model mapped for the inputted 3D model map into a two-dimensional (2D) stretched plane map.

According to another aspect of the disclosure, an image processing method is provided, comprising: mapping and stretching an inputted three-dimensional (3D) model map by using the image processing method according to any embodiment of the present disclosure, obtaining a two-dimensional (2D) stretched plane map; and transcoding the 2D stretched plane map.

According to another aspect of the disclosure, an image processing method is provided, comprising: mapping and stretching an inputted three-dimensional (3D) model map by using the image processing method according to any embodiment of the present disclosure, obtaining a two-dimensional (2D) stretched plane map; transcoding the 2D stretched plane map; sending a transcoded image to a client; and sending to the client an offset between an asymmetric cubemap and the mapping center of the inputted 3D model map, so that the client performs rendering according to the transcoded image and the offset.

According to another aspect of the disclosure, an image processing method is provided, comprising: receiving a transcoded image; receiving an offset, the offset being an offset between an asymmetric cubemap at a transcoding end and the mapping center of an inputted three-dimensional (3D) model map, and the asymmetric cubemap located at a different place than the mapping center of the inputted 3D model map; decoding the received image; and rendering the decoded image according to the offset.

In one implementation, the rendering the decoded image according to the offset comprises any one of the following modes: performing ordinary cub emapping on the decoded image, and rendering the ordinary cubemap according to the offset; or reversely mapping the decoded image into an ordinary cubemap according to the offset, and rendering the ordinary cubemap; or reversely mapping the decoded image into a sphere model according to the offset, and rendering the sphere model.

According to another aspect of the disclosure, a method for processing a panoramic video image is provided, further comprising: processing the panoramic video image in at least one selected direction by using the image processing method based on cubemap mapping according to any embodiment of the present disclosure, obtaining at least one video stream corresponding to the at least one direction.

According to another aspect of the disclosure, a method for processing a panoramic video image is provided, comprising: determining a target direction of a field of view of a user; and receiving a video stream corresponding to the target direction and obtained by using the method for processing a panoramic video image according to any embodiment of the present disclosure.

According to another aspect of the disclosure, an image processing apparatus is provided, comprising: a first mapping module, configured to map an inputted three-dimensional (3D) model map into an asymmetric cubemap, the asymmetric cubemap located at a different place than the mapping center of the inputted 3D model map; and a first stretching module, configured to stretch the asymmetric cubemap mapped for the inputted 3D model map into a two-dimensional (2D) stretched plane map.

In one implementation, the first mapping module comprises: a first mapping sub-module, configured to perform mapping from the center of the asymmetric cubemap so that pixels on a surface of the inputted 3D model map correspond to pixels on a surface of the asymmetric cubemap, the inputted 3D model map being an ordinary cubemap, and the asymmetric cubemap located at a different place than the mapping center of the ordinary cubemap.

In one implementation, the first mapping module further comprises: a second mapping sub-module, configured to perform mapping from the center of the ordinary cubemap so that pixels on a surface of the inputted 3D model map correspond to pixels on a surface of the ordinary cubemap, the inputted 3D model map being a sphere model, and the ordinary cubemap located at the same place as the mapping center of the sphere model; and perform mapping from the center of the asymmetric cubemap so that the pixels on the surface of the ordinary cubemap correspond to pixels on a surface of the asymmetric cubemap, the asymmetric cubemap located at a different place than the mapping center of the ordinary cubemap.

In one implementation, the first mapping module further comprises: a third mapping sub-module, configured to perform mapping from the center of the asymmetric cubemap so that pixels on a surface of the inputted 3D model map correspond to pixels on a surface of the asymmetric cubemap, the inputted 3D model map being a sphere model, and the asymmetric cubemap located at a different place than the mapping center of the sphere model.

In one implementation, the first stretching module is further configured to make the pixels on the surface of the asymmetric cubemap correspond to pixels of the 2D stretched plane map.

In one implementation, the apparatus further comprises: a first determining module, configured to determine a first mapping relationship between 3D coordinates of the ordinary cubemap and 3D coordinates of the asymmetric cubemap according to an offset between the asymmetric cubemap and the mapping center of the ordinary cubemap; and a second determining module, configured to determine a second mapping relationship between the 3D coordinates of the asymmetric cubemap and 2D coordinates of the 2D stretched plane map according to the offset between the asymmetric cubemap and the mapping center of the ordinary cubemap.

In one implementation, the apparatus further comprises: a third determining module, configured to determine a third mapping relationship between polar coordinates of the sphere model and 3D coordinates of the ordinary cubemap; a first determining module, configured to determine a first mapping relationship between the 3D coordinates of the ordinary cubemap and 3D coordinates of the asymmetric cubemap according to an offset between the asymmetric cubemap and the mapping center of the ordinary cubemap; and a second determining module, configured to determine a second mapping relationship between the 3D coordinates of the asymmetric cubemap and 2D coordinates of the 2D stretched plane map according to the offset between the asymmetric cubemap and the mapping center of the ordinary cubemap.

In one implementation, the apparatus further comprises: a fourth determining module, configured to determine a fourth mapping relationship between 3D coordinates of the asymmetric cubemap and polar coordinates of the sphere model according to an offset between the asymmetric cubemap and the mapping center of the sphere model; and a fifth determining module, configured to determine a fifth mapping relationship between the 3D coordinates of the asymmetric cubemap and 2D coordinates of the 2D stretched plane map according to the offset between the asymmetric cubemap and the mapping center of the sphere model.

According to another aspect of the disclosure, an image processing apparatus is provided, comprising: a second mapping module, configured to map an inputted three-dimensional (3D) model map into an asymmetric sphere model, the asymmetric sphere model located at a different place than the mapping center of the inputted 3D model map; and a second stretching module, configured to stretch the asymmetric sphere model mapped for the inputted 3D model map into a two-dimensional (2D) stretched plane map.

According to another aspect of the disclosure, an image processing apparatus is provided, comprising: an image processing module, configured to map and stretch an inputted three-dimensional (3D) model map by using the image processing apparatus according to any embodiment of the present disclosure, obtaining a two-dimensional (2D) stretched plane map; and a transcoding module, configured to transcode the 2D stretched plane map.

According to another aspect of the disclosure, an image processing apparatus based on a cubemap is provided, comprising: an image processing module, configured to map and stretch an inputted three-dimensional (3D) model map by using the image processing apparatus according to any embodiment of the present disclosure, obtaining a two-dimensional (2D) stretched plane map; a transcoding module, configured to transcode the 2D stretched plane map; a first sending module, configured to send a transcoded image to a client; and a second sending module, configured to send to the client an offset between an asymmetric cubemap and the mapping center of the inputted 3D model map, so that the client performs rendering according to the transcoded image and the offset.

According to another aspect of the disclosure, an image processing apparatus is provided, comprising: a first receiving module, configured to receive a transcoded image; a second receiving module, configured to receive an offset, the offset being an offset between an asymmetric cubemap at a transcoding end and the mapping center of an inputted three-dimensional (3D) model map, and the asymmetric cubemap located at a different place than the mapping center of the inputted 3D model map; a decoding module, configured to decode the received image; and a rendering module, configured to render the decoded image according to the offset.

In one implementation, the rendering module comprises any one of the following: a first rendering sub-module, configured to perform ordinary cubemapping on the decoded image, and render the ordinary cubemap according to the offset; or a second rendering sub-module, configured to reversely map the decoded image into an ordinary cubemap according to the offset, and render the ordinary cubemap; or a third rendering sub-module, configured to reversely map the decoded image into a sphere model according to the offset, and render the sphere model.

According to another aspect of the disclosure, a system for processing a panoramic video image is provided, comprising: the image processing apparatus according to any embodiment of the present disclosure, configured to process the panoramic video image in at least one selected direction obtaining at least one video stream corresponding to the at least one direction.

According to another aspect of the disclosure, a system for processing a panoramic video image is provided, comprising: a direction determining module, configured to determine a target direction of a field of view of a user; and a receiving module, configured to receive a video stream corresponding to the target direction and obtained by using the system for processing a panoramic video image according to any embodiment of the present disclosure.

Since the asymmetric cubemap is located at a different place than the mapping center of the inputted three-dimensional (3D) model map, after the inputted 3D model map is mapped into the asymmetric cubemap and stretched into a two-dimensional (2D) plane, the image resolution can be maintained in one face of the asymmetric cubemap and the image resolution can be reduced in other faces, so that high image resolution in an ROI of a user can be maintained, and the resolution of regions away from the ROI can slowly decrease, thereby lowering the overall resolution of the 2D stretched plane map and reducing the amount of data for subsequent processing.

Other features and aspects of the present disclosure will become apparent from the following detailed description of exemplary embodiments with reference to the accompanying drawings.

BRIEF DESCRIPTION OF THE DRAWINGS

The accompanying drawings, which are included in the description and form part of the description, illustrate the exemplary embodiments, features, and aspects of the disclosure together with the description, and are used to explain the principles of the disclosed embodiments.

As shown in FIG. 4, the method may include the following steps.

DETAILED DESCRIPTION

Figure 1:
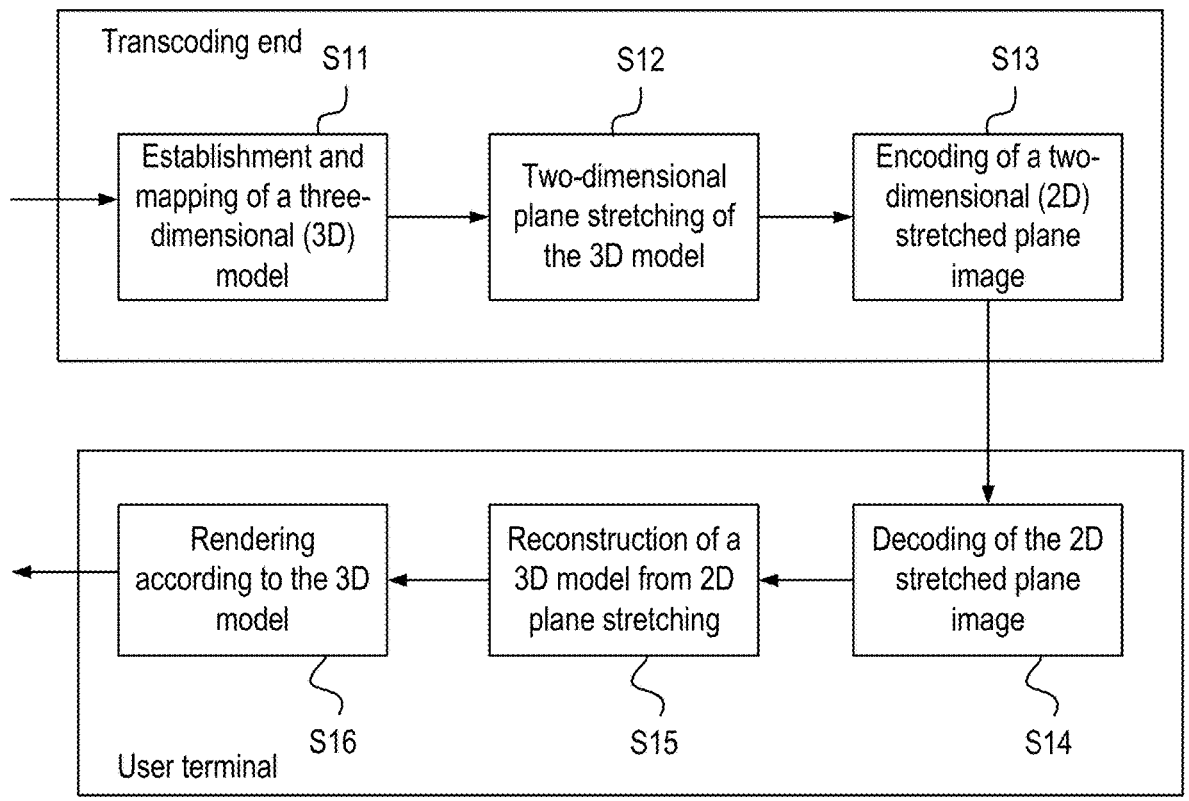
FIG. 1 is a flow diagram illustrating a method for panoramic video processing based on three-dimensional (3D) model mapping and two-dimensional (2D) plane stretching according to some embodiments of the disclosure.

Various exemplary embodiments, features, and aspects of the disclosure are described in detail below with reference to the accompanying drawings. The same reference numerals in the drawings represent elements that have the same or similar functions. While various aspects of the embodiments are illustrated in the drawings, the drawings are not necessarily drawn to scale unless specifically stated.

The word "exemplary" dedicated herein means "used as an example or embodiment, or is illustrative." Any of the embodiments illustrated herein as "exemplary" is not necessarily interpreted as being superior to or better than other embodiments.

In addition, to better illustrate the embodiments of the disclosure, numerous specific details are given in the detailed description below. It should be understood by those skilled in the art that the disclosed embodiments can be implemented without some of the specific details. In some examples, the methods, means, elements, and circuits well known to those skilled in the art are not described in detail to highlight the gist of the disclosure.

FIG. 1 is a flow diagram illustrating a method for panoramic video processing based on three-dimensional (3D) model mapping and two-dimensional (2D) plane stretching according to some embodiments of the disclosure.

As shown in FIG. 1, the panoramic video processing flow may include: after receiving an inputted virtual reality (VR) panoramic video, a transcoding end (also referred to as a mapping end) first establishes a 3D model and obtains mapping of the inputted video to a new model by a mapping method (S11). Then, the transcoding end performs 2D plane stretching on the 3D model according to a certain rule (S12). Subsequently, the transcoding end sends the 2D stretched plane map to an encoder for encoding (S13).

After receiving an encoded code stream, a user terminal (for example, a client) first performs decoding to recover the 2D stretched plane map (S14). Then, the user terminal performs 3D model reconstruction according to the 2D stretched plane map using the same method as that of the transcoding end (S15). Finally, the user terminal renders an output image according to a field of view of viewing of a user using a reconstructed 3D model (S16).

Figure 2A:
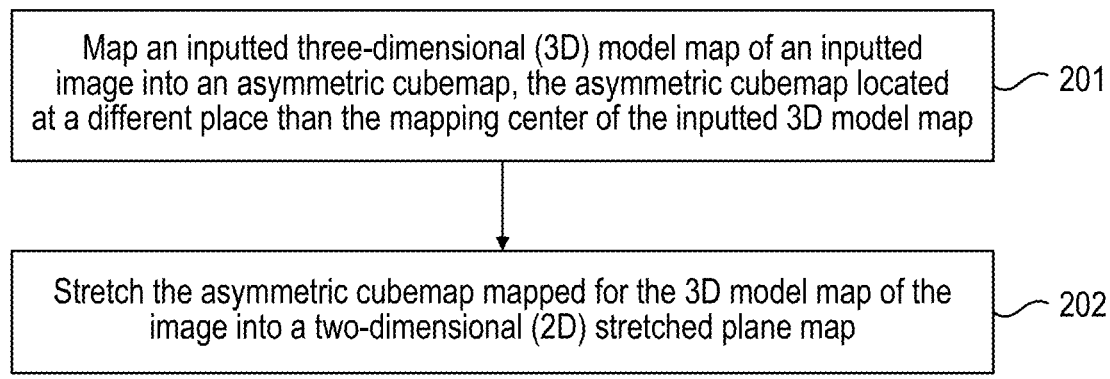
FIG. 2A is a flow diagram illustrating an image processing method based on a cubemap according to some embodiments of the disclosure.

FIG. 2A is a flow diagram illustrating an image processing method based on a cubemap according to some embodiments of the disclosure. As shown in FIG. 2a, the method may include the following steps.

Figure 9:
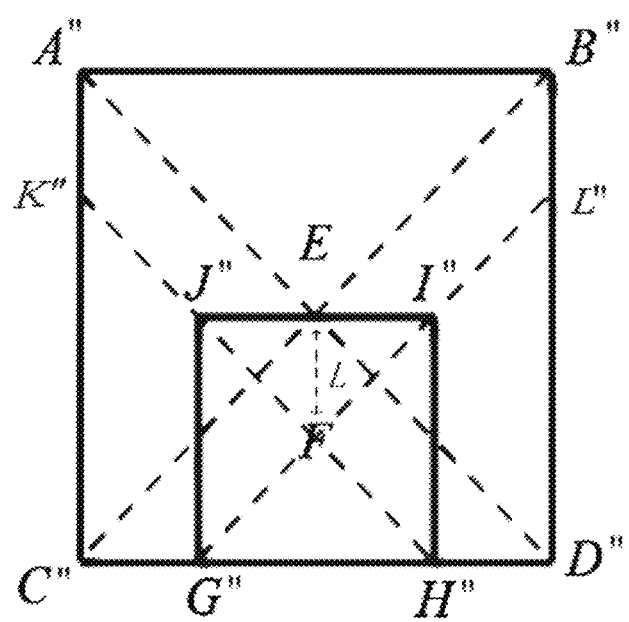
FIG. 9 is a two-dimensional (2D) view of an asymmetric cubemap.
Figure 11:
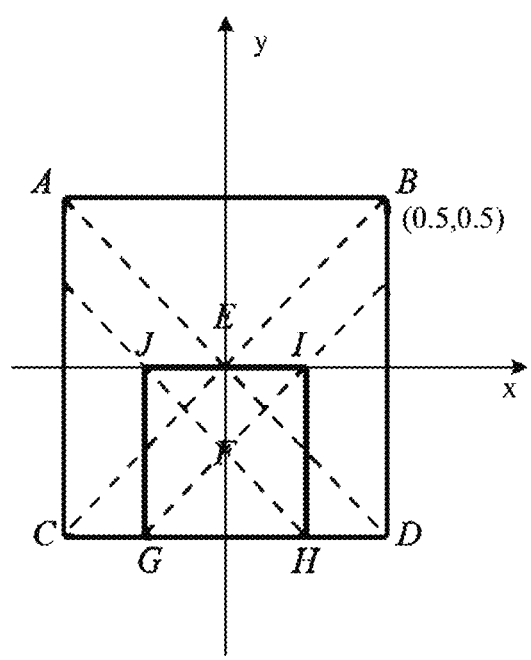
FIG. 11 is a schematic diagram illustrating the calculation of a side length of the asymmetric cubemap.

In step 201, the method maps an inputted 3D model map into an asymmetric cubemap, the asymmetric cubemap located at a different place than the mapping center of the inputted 3D model map. For example, as shown in FIGS. 9 and 11, a certain offset exists between the asymmetric cubemap and the mapping center of an ordinary cubemap.

In step 202, the method stretches the asymmetric cubemap mapped for the inputted 3D model map into a 2D stretched plane map.

Referring to FIG. 1, the transcoding end (e.g., a server) may apply the method depicted in FIG. 2.

In the illustrated embodiment, the inputted 3D model map may include a variety of types. For example, an original 2D image is subjected to sphere mapping (e.g., equirectangular mapping) to obtain a 3D model map. In another example, an original 2D image is subjected to ordinary cubemap mapping to obtain a 3D model map. The original 2D image may be an image such as a VR panoramic video, a non-panoramic (for example, 180-degree) video, or a 3D panoramic video.

Figure 7:
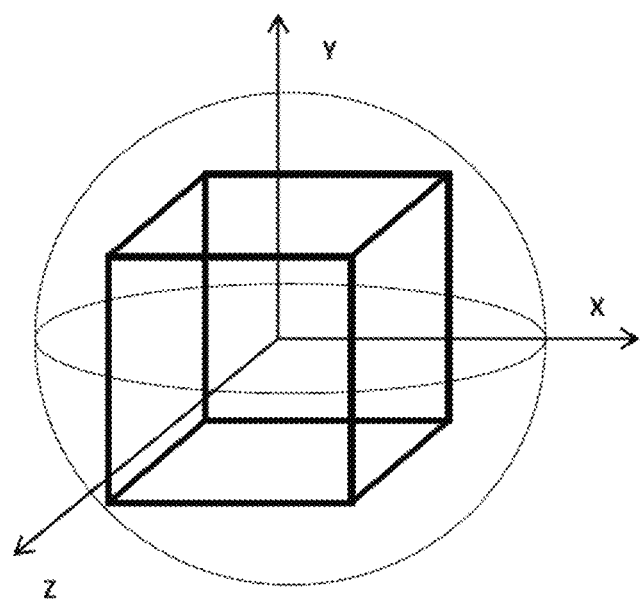
FIG. 7 is a diagram illustrating the mapping of a sphere to an ordinary cubemap.

FIG. 7 is a diagram illustrating the mapping of a sphere to an ordinary cubemap. As shown in FIG. 7, the basic principle of the mapping is to make pixel coordinates on the surface of the sphere correspond to pixel coordinates on the surface of a closed space solid to which the sphere is mapped. The space solids in FIG. 7 are respectively a sphere and a cube, and both are symmetric about the center, which is the origin of coordinates. A ray drawn from the origin of coordinates passes through the surfaces of the cube and the sphere separately, so that pixel coordinates on the surface of the sphere can correspond to pixel coordinates on the surface of the cube. The ordinary cubemap mapping uses an origin of coordinates the same as the central point of a sphere model as the mapping center, while the asymmetric cubemap mapping uses an origin of coordinates having a certain offset from the central point of a sphere model as the mapping center, mapping pixels on the surface of the sphere to pixels on the surface of the cube.

In one implementation, in step 201, the mapping an inputted 3D model map into an asymmetric cubemap includes any one of the following Examples 1, 2, or 3.

Example 1

The Inputted 3D Model Map is an Ordinary Cubemap

In this example, mapping is performed from the center of an asymmetric cubemap so that pixels on a surface of the ordinary cubemap correspond to pixels on a surface of the asymmetric cubemap. The asymmetric cubemap is located at a different place than the mapping center of the ordinary cubemap.

Example 2

The Inputted 3D Model Map is a Sphere Model

Figure 10:
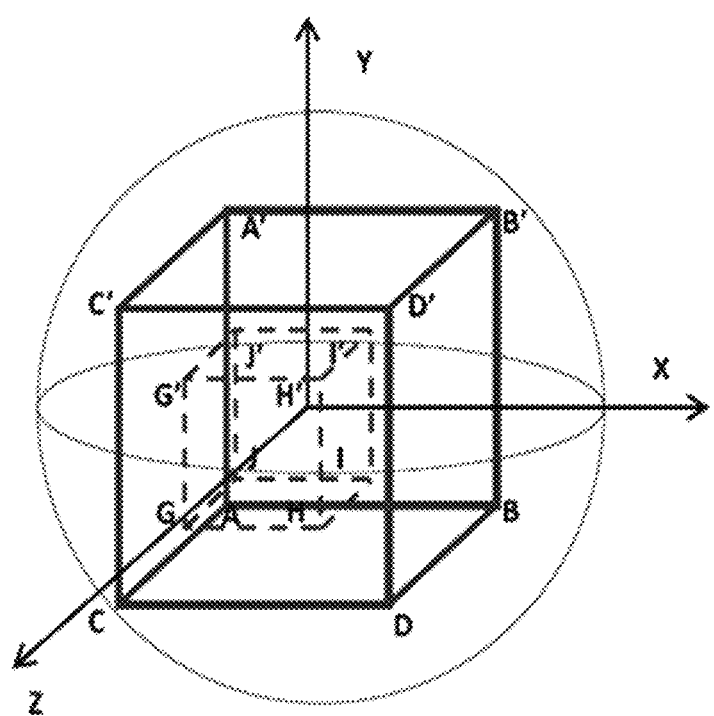
FIG. 10 is a three-dimensional (3D) view of an asymmetric cubemap.

Referring to FIG. 10, in this example, the mapping is performed from the center of an ordinary cubemap so that pixels on a surface of the sphere model correspond to pixels on a surface of the ordinary cubemap. Mapping is performed from the center of an asymmetric cubemap so that pixels on a surface of the ordinary cubemap correspond to pixels on a surface of the asymmetric cubemap. The asymmetric cubemap is located at a different place than the mapping center of the ordinary cubemap, whereas the ordinary cubemap is located at the same place as the mapping center of the sphere model.

Example 3

The Inputted 3D Model Map is a Sphere Model

In this example, mapping is performed from the center of an asymmetric cubemap so that pixels on a surface of the sphere model correspond to pixels on a surface of the asymmetric cubemap, the asymmetric cubemap located at a different place than the mapping center of the sphere model.

In one implementation of FIG. 2, step 202 may include making the pixels on the surface of the asymmetric cubemap correspond to pixels of the 2D stretched plane map.

In one implementation, for Examples 1, 2, and 3 of step 201, the image processing method based on the cubemap further includes corresponding steps of determining mapping relationships between different models.

For Example 1, the method further includes determining a first mapping relationship between 3D coordinates of the ordinary cubemap and 3D coordinates of the asymmetric cubemap according to an offset between the asymmetric cubemap and the mapping center of the ordinary cubemap. The method then determines a second mapping relationship between the 3D coordinates of the asymmetric cubemap and 2D coordinates of the 2D stretched plane map according to the offset between the asymmetric cubemap and the mapping center of the ordinary cubemap. Table 1, in the following embodiment, illustrates the first mapping relationship. Table 2, in the following embodiment, illustrates the second mapping relationship.

In this way, in Example 1, according to the first mapping relationship, the mapping may be performed from the center of an asymmetric cubemap so that pixels on a surface of the ordinary cubemap correspond to pixels on a surface of the asymmetric cubemap. Moreover, according to the second mapping relationship, the asymmetric cubemap mapped for the inputted 3D model map is stretched into a 2D plane.

For Example 2, the method further includes determining a third mapping relationship between polar coordinates of the sphere model and 3D coordinates of the ordinary cubemap. The method then determines a first mapping relationship between the 3D coordinates of the ordinary cubemap and 3D coordinates of the asymmetric cubemap according to an offset between the asymmetric cubemap and the mapping center of the ordinary cubemap. Finally, the method determines a second mapping relationship between the 3D coordinates of the asymmetric cubemap and 2D coordinates of the 2D stretched plane map according to the offset between the asymmetric cubemap and the mapping center of the ordinary cubemap. For example, Equations 1 and 2, in the following embodiment, illustrate a third mapping relationship.

In this way, in Example 2, according to the third mapping relationship, the mapping may be performed from the center of an ordinary cubemap so that pixels on a surface of the sphere model correspond to pixels on a surface of the ordinary cubemap. According to the first mapping relationship, mapping is performed from the center of an asymmetric cubemap so that pixels on a surface of the ordinary cubemap correspond to pixels on a surface of the asymmetric cubemap. Moreover, according to the second mapping relationship, the asymmetric cubemap mapped for the inputted 3D model map is stretched into a 2D plane.

For Example 3, the method further includes determining a fourth mapping relationship between 3D coordinates of the asymmetric cubemap and polar coordinates of the sphere model according to an offset between the asymmetric cubemap and the mapping center of the sphere model. Then the method determines a fifth mapping relationship between the 3D coordinates of the asymmetric cubemap and 2D coordinates of the 2D stretched plane map according to the offset between the asymmetric cubemap and the mapping center of the sphere model.

In this way, in Example 3, according to the fourth mapping relationship, the mapping may be performed from the center of an asymmetric cubemap so that pixels on a surface of the sphere model correspond to pixels on a surface of the asymmetric cubemap. Moreover, according to the fifth mapping relationship, the asymmetric cubemap mapped for the inputted 3D model map is stretched into a 2D plane.

In this embodiment, the asymmetric cubemap is located at a different place than the mapping center of the inputted 3D model map. Due to this mapping, after the inputted 3D model map is mapped into the asymmetric cubemap and stretched into a 2D plane, the image resolution can be maintained in one face of the asymmetric cubemap and the image resolution can be reduced in other faces. In this manner, high image resolution in an ROI, a primary field of view for example, of a user can be maintained, and the resolution of regions away from the ROI can slowly decrease, thereby lowering the overall resolution of the 2D stretched plane map and reducing the amount of data for subsequent processing. As a result, the image quality in the disclosed embodiments deteriorates very slowly over a wider range as compared with the pyramid mapping mode.

Figure 2B:
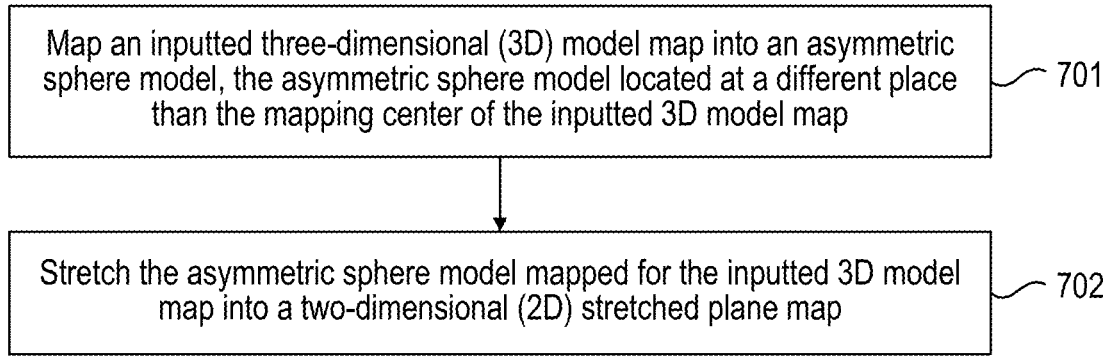
FIG. 2B is a flow diagram illustrating a method for image processing according to some embodiments of the present disclosure.

FIG. 2B is a flow diagram illustrating a method for image processing according to some embodiments of the present disclosure. As shown in FIG. 2B, the method may include the following steps.

In step 701, the method maps an inputted 3D model map into an asymmetric sphere model, the asymmetric sphere model located at a different place than the mapping center of the inputted 3D model map.

In step 702, the method stretches the asymmetric sphere model mapped for the inputted 3D model map into a 2D stretched plane map.

Referring to FIG. 1, a transcoding end (e.g., a server) may apply the method depicted in FIG. 2B. Reference may be made to the relevant description of the aforementioned embodiment for the basic principle of mapping in this method. Like asymmetric cubemap mapping, asymmetric sphere model mapping uses an origin of coordinates having a certain offset from the central point of an ordinary sphere model as the mapping center so that pixels on a surface of the ordinary sphere model or an ordinary cubemap correspond to pixels on a surface of an asymmetric sphere model (or referred to as an offset sphere model).

In one implementation of FIG. 2B, in step 701, the mapping an inputted 3D model map into an asymmetric sphere model includes any one of the following Examples 4, 5, or 6.

Example 4

The Inputted 3D Model Map is an Ordinary Cubemap

In this example, mapping is performed from the center of the asymmetric sphere model so that pixels on a surface of the inputted 3D model map correspond to pixels on a surface of the asymmetric sphere model, the inputted 3D model map being an ordinary cubemap, and the asymmetric sphere model located at a different place than the mapping center of the ordinary cubemap.

Example 5

The Inputted 3D Model Map is an Ordinary Sphere Model

In this example, mapping is performed from the center of an ordinary cubemap so that pixels on a surface of the inputted 3D model map correspond to pixels on a surface of the ordinary cubemap, the inputted 3D model map being an ordinary sphere model, and the ordinary cubemap located at the same place as the mapping center of the ordinary sphere model. Additionally, mapping is performed from the center of the asymmetric sphere model so that pixels on a surface of the ordinary cubemap correspond to pixels on a surface of the asymmetric sphere model, the asymmetric sphere model located at a different place than the mapping center of the ordinary cubemap.

Example 6

The Inputted 3D Model Map is an Ordinary Sphere Model.

In this example, mapping is performed from the center of the asymmetric sphere model so that pixels on a surface of the inputted 3D model map correspond to pixels on a surface of the asymmetric sphere model, the inputted 3D model map being an ordinary sphere model, and the asymmetric sphere model located at a different place than the mapping center of the ordinary sphere model.

In one implementation of FIG. 2B, step 702 may include making the pixels on the surface of the asymmetric sphere model correspond to pixels of the 2D stretched plane map. In one implementation, for Examples 4, 5, or 6, the image processing method further includes corresponding steps of determining mapping relationships between different models.

For Example 4, the method further includes determining a sixth mapping relationship between 3D coordinates of the ordinary cubemap and polar coordinates of the asymmetric sphere model according to an offset between the asymmetric sphere model and the mapping center of the ordinary cubemap. The method then determines a seventh mapping relationship between the polar coordinates of the asymmetric sphere model and 2D coordinates of the 2D stretched plane map according to the offset between the asymmetric sphere model and the mapping center of the ordinary cubemap.

In this way, in Example 4, according to the sixth mapping relationship, the mapping may be performed from the center of an asymmetric sphere model so that pixels on a surface of the ordinary cubemap correspond to pixels on a surface of the asymmetric sphere model. Moreover, according to the seventh mapping relationship, the asymmetric sphere model mapped for the inputted 3D model map is stretched into a 2D plane.

For Example 5, the method further includes determining an eighth mapping relationship between polar coordinates of the ordinary sphere model and 3D coordinates of the ordinary cubemap. The method then determines a sixth mapping relationship between the 3D coordinates of the ordinary cubemap and polar coordinates of the asymmetric sphere model according to an offset between the asymmetric sphere model and the mapping center of the ordinary cubemap. Finally, the method determines a seventh mapping relationship between the polar coordinates of the asymmetric sphere model and 2D coordinates of the 2D stretched plane map according to the offset between the asymmetric sphere model and the mapping center of the ordinary cubemap.

In this way, in Example 5, according to the eighth mapping relationship, the mapping may be performed from the center of an ordinary cubemap so that pixels on a surface of the ordinary sphere model correspond to pixels on a surface of the ordinary cubemap. According to the sixth mapping relationship, mapping is performed from the center of the asymmetric sphere model so that pixels on a surface of the ordinary cubemap correspond to pixels on a surface of the asymmetric sphere model. Moreover, according to the seventh mapping relationship, the asymmetric sphere model mapped for the inputted 3D model map is stretched into a 2D plane.

For Example 6, the method further includes determining a ninth mapping relationship between polar coordinates of the asymmetric sphere model and polar coordinates of the ordinary sphere model according to an offset between the asymmetric sphere model and the mapping center of the ordinary sphere model. Then, the method determines a tenth mapping relationship between the polar coordinates of the asymmetric sphere model and 2D coordinates of the 2D stretched plane map according to the offset between the asymmetric sphere model and the mapping center of the ordinary sphere model.

In this way, in Example 6, according to the ninth mapping relationship, the mapping may be performed from the center of an asymmetric sphere model so that pixels on a surface of the ordinary sphere model correspond to pixels on a surface of the asymmetric sphere model. Moreover, according to the tenth mapping relationship, the asymmetric sphere model mapped for the inputted 3D model map is stretched into a 2D plane.

Figure 3A:
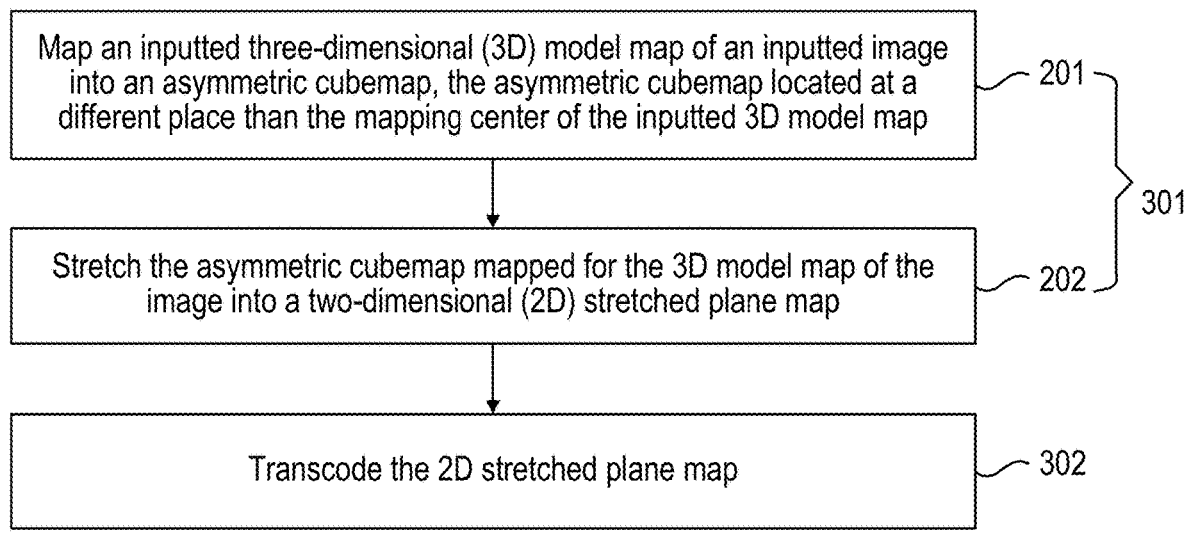
FIG. 3A and FIG. 3B are flow diagrams illustrating methods for image processing according to some embodiments of the disclosure.

FIG. 3A is a flow diagram illustrating a method for image processing according to some embodiments of the disclosure. As shown in FIG. 3A, the method may include the following steps.

In step 301, the method maps and stretches an inputted 3D model map by using the image processing methods described previously in the descriptions of steps 201 and 202 and steps 701 and 702, obtaining a 2D stretched plane map. Details of steps 201, 202, 701, and 702 are not repeated herein.

In step 302, the method transcodes the 2D stretched plane map.

Figure 3B:
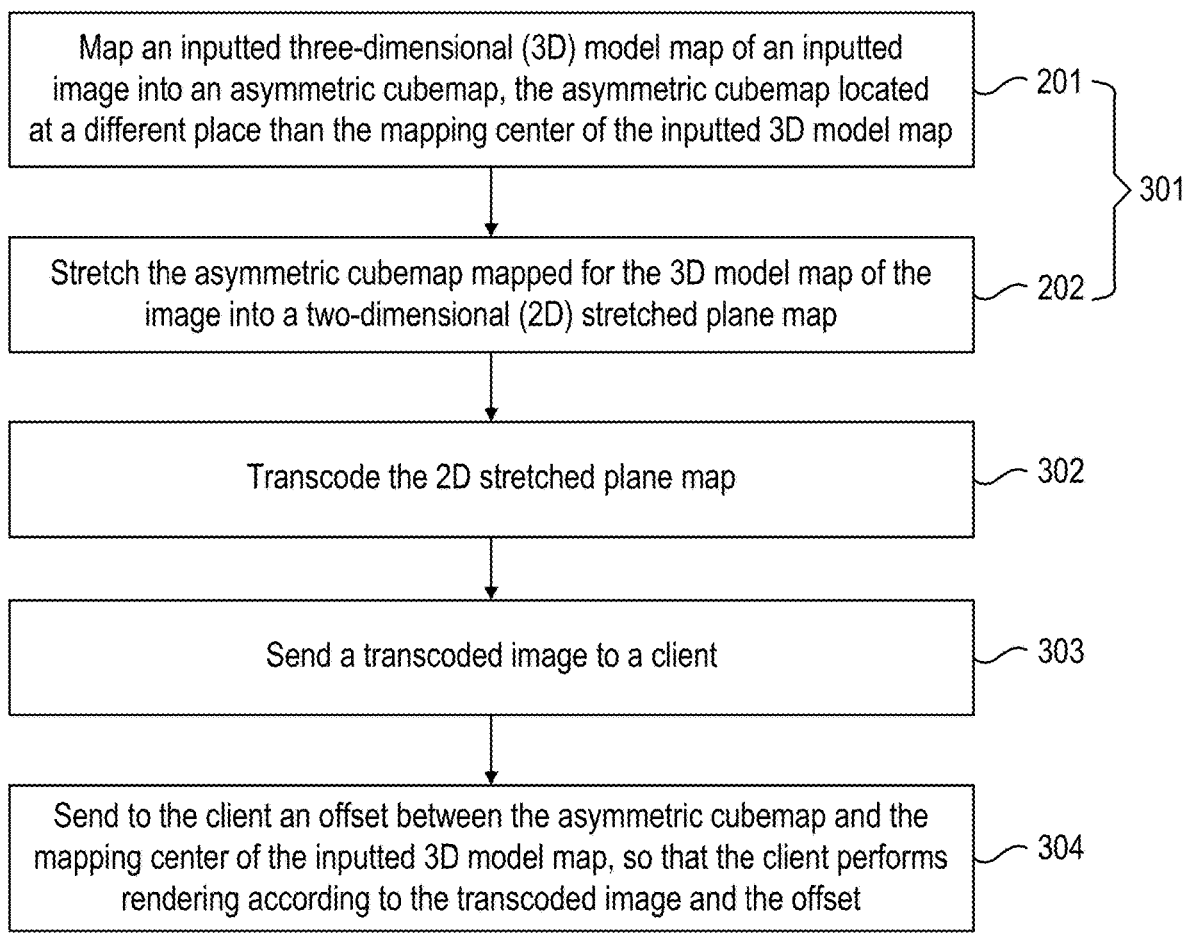

In another embodiment, as shown in FIG. 3B, an image processing method includes steps 301 and 302 (described in the description of FIG. 3A) and may further include the following steps.

In step 303, the method sends a transcoded image to a client.

In step 304, the method sends an offset between an asymmetric cubemap and the mapping center of the inputted 3D model map to the client. The sending of the offset causes the client to perform rendering according to the transcoded image and the offset.

At the transcoding end, the transcoding end subjects an inputted 3D model map to asymmetric cube mapping and stretches the mapping into a 2D plane to obtain a 2D stretched plane map. The transcoding end transcodes (or encodes) the 2D stretched plane map and sends a transcoded image to the client. Moreover, the transcoding end may further send the client the offset between the asymmetric cubemap and the mapping center of the inputted 3D model map. In this way, the client can decode the received image and then render the decoded image according to the offset. The transcoding end may send the offset to the client in many modes, for example, sending a Uniform Resource Locator (URL) carrying the offset to the client so that the client parses the URL to obtain the offset.

In this embodiment, the asymmetric cubemap is located at a different place than the mapping center of the inputted 3D model map. Due to this mapping, after the inputted 3D model map is mapped into the asymmetric cubemap and stretched into a 2D plane, high resolution can be maintained in a primary field of view of a user and the overall resolution of the 2D stretched plane map can be reduced. In this manner, the amount of data processing for transcoding can be reduced while ensuring image quality, thereby reducing the amount of data transmitted from the transcoding end to the client and reducing the amount of data processing during operations such as decoding and rendering performed by the client. The image quality in the present disclosure deteriorates very slowly over a wider range as compared with the pyramid mapping mode.

Figure 4:
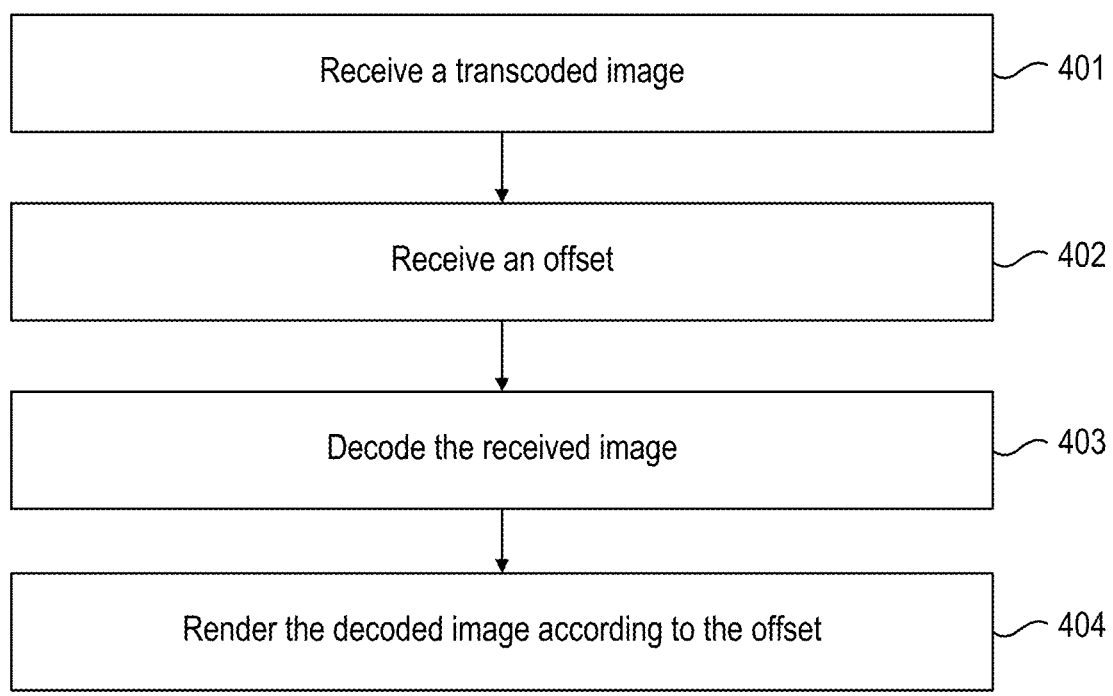
FIG. 4 is a flow diagram illustrating a method for image processing according to some embodiments of the disclosure.

FIG. 4 is a flow diagram illustrating a method for image processing according to some embodiments of the disclosure. As shown in FIG. 4, the method may include the following steps.

In step 401, the method receives a transcoded image.

In step 402, the method receives an offset, the offset comprising an offset between an asymmetric cubemap at a transcoding end and the mapping center of an inputted 3D model map, and the asymmetric cubemap located at a different place than the mapping center of the inputted 3D model map.

In step 403, the method decodes the received image.

In step 404, the method renders the decoded image according to the offset.

At the transcoding end, an inputted 3D model map is subjected to asymmetric cube mapping and stretched into a 2D plane to obtain a 2D stretched plane map, and then the transcoding end transcodes (or encodes) the 2D stretched plane map. Then, the transcoding end may send a transcoded image to a client and may further send to the client the offset between the asymmetric cubemap and the mapping center of the inputted 3D model map. In this way, after receiving the transcoded image and the offset, the client can decode the received image and then render the decoded image according to the offset.

In one implementation of step 404, the rendering the decoded image according to the offset includes any one of the following techniques: (1) performing ordinary cubemapping on the decoded image and rendering the ordinary cubemap according to the offset; (2) reversely mapping the decoded image into an ordinary cubemap according to the offset and rendering the ordinary cubemap; or (3) reversely mapping the decoded image into a sphere model according to the offset, and rendering the sphere model.

Also, in practical applications, an offset parameter (e.g., the transmitted offset) of the asymmetric cubemap mapping at the transcoding end should be consistent with a rendering parameter of the client. Thus, the corresponding parameter also needs to be set in a user terminal to obtain a correct rendering. For example, the transcoding end may send an offset to the user terminal through a URL. After receiving the offset, the user terminal may render the image according to the parameter. A plurality of rendering modes exists, such as the following modes.

In one embodiment, the user terminal may reconstruct an asymmetric cubemap according to the offset and determine coordinates of the mapping center of the asymmetric cubemap. Then, the user terminal renders the mapped model according to the coordinates of the mapping center of the asymmetric cube.

In another embodiment, the user terminal obtains a 3D model of a cubemap (or a sphere model) by reverse mapping according to the offset and then renders the model.

In one implementation, the received offset may also be an offset between an asymmetric sphere model at the transcoding end and the mapping center of the inputted 3D model map. In this implementation, the asymmetric sphere model is located at a different place than the mapping center of the inputted 3D model map. In this case, in step 404, the rendering of the decoded image according to the offset may include reversely mapping the decoded image into an ordinary sphere model according to the offset, and rendering the ordinary sphere model. In addition, a reverse mapping may not be performed; instead, the asymmetric sphere model is directly rendered at the offset position.

In this embodiment, the asymmetric cubemap is located at a different place than the mapping center of the inputted 3D model map. Due to this mapping, after the inputted 3D model map is mapped into the asymmetric cubemap and stretched into a 2D plane, high resolution can be maintained in a primary field of view of a user and the overall resolution of the 2D stretched plane map can be reduced. In this manner, the amount of data processing for transcoding can be reduced while ensuring image quality, thereby reducing the amount of data transmitted from the transcoding end to the client and reducing the amount of data processing during operations such as decoding and rendering performed by the client. The image quality in the present disclosure deteriorates very slowly over a wider range as compared with the pyramid mapping mode.

Figure 5:
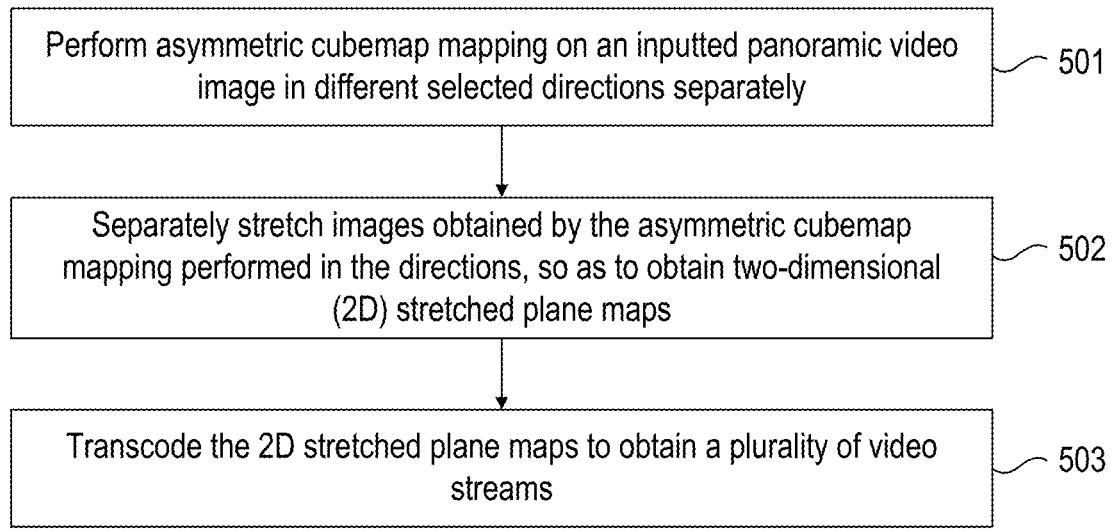
FIG. 5 is a flow diagram illustrating a method for processing a panoramic video image according to some embodiments of the disclosure.

FIG. 5 is a flow diagram illustrating a method for processing a panoramic video image according to some embodiments of the disclosure. As shown in FIG. 5, the method may include processing a panoramic video image in at least one selected direction by using the image processing method based on cubemap mapping according to any of the embodiments described above in FIGS. 2A through FIG. 4 and obtaining at least one video stream corresponding to the at least one direction.

In one example, the method illustrated in FIG. 5 may specifically include the following steps.

In step 501, at a transcoding end, the method performs asymmetric cubemap mapping on an inputted panoramic video image in different selected directions separately.

In step 502, the method separately stretches images obtained by the asymmetric cubemap mapping performed in the directions, obtaining 2D stretched plane maps.

In step 503, the method transcodes the 2D stretched plane maps to obtain a plurality of video streams.

The video streams have the characteristics of high resolution in an ROI and low resolution in other regions. The transcoding end may return corresponding video streams to a client according to different fields of view of a user, ensuring that the user can watch clear panoramic video images from various fields of view (namely, ROIs).

Figure 6:
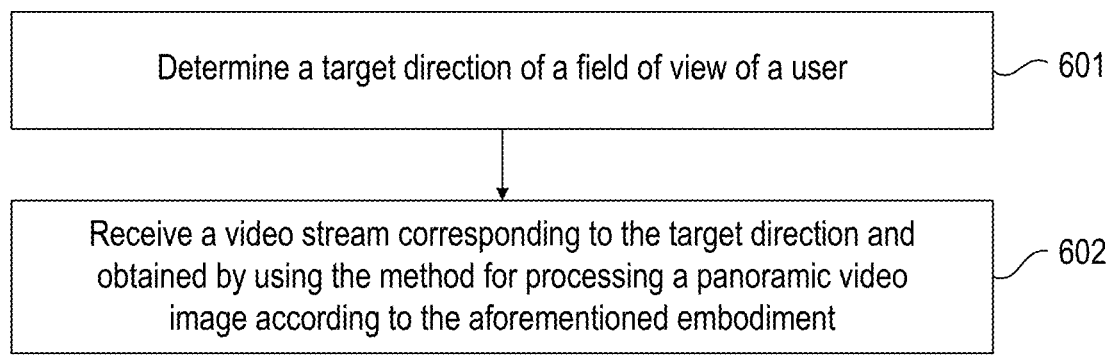
FIG. 6 is a flow diagram illustrating a method for processing a panoramic video image according to some embodiments of the disclosure.

FIG. 6 is a flow diagram illustrating a method for processing a panoramic video image according to some embodiments of the disclosure. As shown in FIG. 6, the method may include the following steps.

In step 601, the method determines a target direction of a field of view of a user.

In step 602, the method receives a video stream corresponding to the target direction and obtained by using the methods for processing a panoramic video image according to the previously discussed embodiments.

At the transcoding end, asymmetric cubemap mapping and stretching may be performed on an inputted panoramic video image in different selected directions separately to obtain a plurality of video streams. The video streams have the characteristics of high resolution in an ROI and low resolution in other regions.

In the disclosed embodiments, the transcoding end may be disposed in a server or may be separate from the server.

After a client determines a target direction of a field of view of a user, the client sends a play request of the target direction to the server. After receiving the play request, the server may acquire from the transcoding end a video stream corresponding to the target direction and send the video stream to the client, switching between different video streams for different fields of view of the user, thereby ensuring that the user can watch clear panoramic video images from various fields of view (namely, ROIs).

Another implementation is that after generating video streams corresponding to various directions, the transcoding end stores the video streams corresponding to the directions and sends download addresses of the video streams corresponding to the directions to the client. After determining a target direction of a field of view of a user, the client may find a download address corresponding to the target direction and then download a video stream corresponding to the target direction from the download address.

The disclosed embodiments improve the ordinary cubemap model and solve the problem arising in the pyramid model by an asymmetric cubemap model. As compared with the ordinary cubemap, the asymmetric cubemap obtains asymmetric resolution by mapping, part with the resolution of the ordinary cubemap maintained, and part with the resolution reduced. Also, the asymmetric cubemap has a certain offset from the mapping center of the ordinary cubemap, so that the asymmetric cubemap may also be referred to as an offset cubemap (Biascubemap). The mapping principle of the asymmetric cubemap is illustrated below by using improvement based on the ordinary cubemap as an example.

Figure 8:
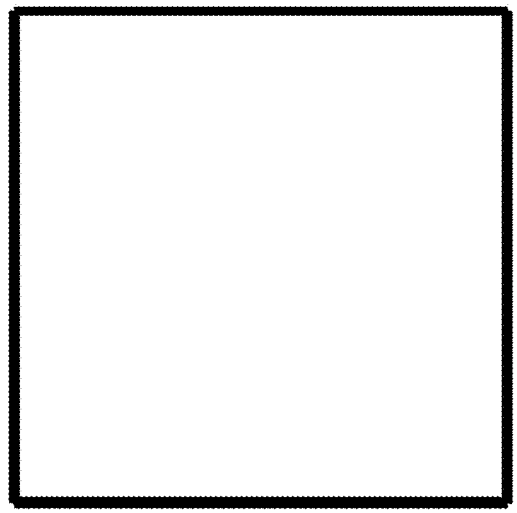
FIG. 8 is a two-dimensional (2D) view of an ordinary cubemap.

FIG. 8 is a 2D view of an ordinary cubemap. FIG. 9 is a 2D view of an asymmetric cubemap. FIG. 10 is a 3D view of the asymmetric cubemap. FIG. 9 may be regarded as a top view of FIG. 10, indicating that the mapping center of the asymmetric cubemap is offset in the Z-axis relative to mapping center of the ordinary cubemap. The A"B"C"D" in FIG. 9 is regarded as an ordinary cubemap. If an asymmetric cubemap needs to be generated, then the mapping center F of the asymmetric cubemap is positioned first. The mapping center F of the asymmetric cubemap may be obtained by offsetting the mapping center E of the ordinary cubemap. For example, the distance of the downward offset of F relative to E is L. In practical applications, L is a parameter that can be flexibly configured according to actual requirements. After the position of F is determined, parallel lines of diagonal lines A"D" and C"B" are drawn through F, and respectively intersect the side C"D" at points G" and H". Subsequently, an entirety G"H"I"J" of the asymmetric cubemap is constructed through this side G"H".

Afterward, after the position and shape G"H"I"J" of the asymmetric cubemap are obtained, asymmetric cubemap mapping can be performed on an inputted 3D model map subjected to equirectangular mapping by using F as the center, obtaining a hexahedron (cube) of the asymmetric cubemap. A side length of the hexahedron is different from that of a cube of the ordinary cubemap. For example, the side length of the cube of the asymmetric cubemap is G"H", and the side length of the cube of the ordinary cubemap is C"D".

The core parameter of the asymmetric cubemap is the offset distance L. L can directly determine the side length and stretched area of the cube of the asymmetric cubemap. Assuming that the distance between E and F in FIG. 9 is ¼ of the side length of the square A"B"C"D", the side length G"H" of the cube obtained by asymmetric cubemap mapping is ½ of the side length C"D" of the cube obtained by ordinary cubemap mapping. Then, the entire area after asymmetric cubemap mapping and stretching is 25% of the area after ordinary cubemap mapping and stretching. A larger L indicates a smaller stretched area of the cube obtained by asymmetric cubemap mapping, and thus a smaller encoding rate is required and greater image loss is caused. However, the image quality of asymmetric cubemap mapping and stretching deteriorates very slowly over a wider range as compared with pyramid mapping.

Given the above, the asymmetric cubemap differs from the ordinary cubemap in the construction of the mapping position and mapping center of the asymmetric cubemap. Unlike the ordinary cubemap, the mapping center of the asymmetric cubemap in FIG. 9 is not E, but F. The distance between E and F is L. In this way, the resolution of ordinary cubemap mapping can be maintained in G"H" (pixels of G"H" of the ordinary cubemap are intactly mapped to pixels of G"H" of the asymmetric cubemap). The resolution d gradually decreases in mapping from G"H" to A"B". For example, H"D" and D"L" of the ordinary cubemap are mapped to I"H" of the asymmetric cubemap. Moreover, L"B", B"A", and A"K" are mapped to I"J" of the asymmetric cubemap.

It should be noted that the mapping principle described above is described based on a 2D view. In practice, the construction of asymmetric cubemap mapping is performed in three dimensions. The mapping of an asymmetric cubemap for a 3D model can be obtained by using the above mapping principle of the asymmetric cubemap in the 2D view. The mapping principle of the 2D views G"H"I"J" and A"B"C"D" in FIG. 9 is indicated by a 3D model in FIG. 10. The 2D square G"H"I"J" of FIG. 9 corresponds to the cube GHIJG'H'I'J' of FIG. 10. GHG'H' and CDC'D' are on the same plane. Moreover, the square A"B"C"D" in FIG. 9 corresponds to the cubemap ABCDA'B'C'D' in FIG. 10. Mapping is performed from the center F of GHIJG'H'I'J' so that each pixel on a surface of the cubemap GHIJG'H'I'J corresponds to a pixel on a surface of ABCDA'B'C'D'. Mapping is performed from the center E of ABCDA'B'C'D' so that each pixel on a surface of ABCDA'B'C'D' corresponds to a pixel on a surface of a sphere. Through the aforementioned two steps, the mapping between the cubemap GHIJG'H'I'J and the sphere can be obtained. Assuming L in FIG. 9 is ¼ of the length of A"B", it can be obtained that the length of G"H" is ½ of the length of C"D". In this implementation, after the rear face ABA'B' is mapped, the horizontal resolution and vertical resolution are both downsampled three times.

In addition, referring to FIG. 10, the mapping may further be performed directly from the surface of the sphere model to the surface of the asymmetric cubemap GHIJG'H'I'J'. In this mode, the setting method for the position and the side length of GHIJG'H'I'J' is the same as the aforementioned first asymmetric cubemap mode. Unlike the first mapping mode, mapping is performed directly through the center of GHIJG'H'I'J' to obtain a mapping relationship between six surfaces of GHIJG'H'I'J' and the surface of the sphere model without transition through ABCDA'B'C'D'.

Figure 19:
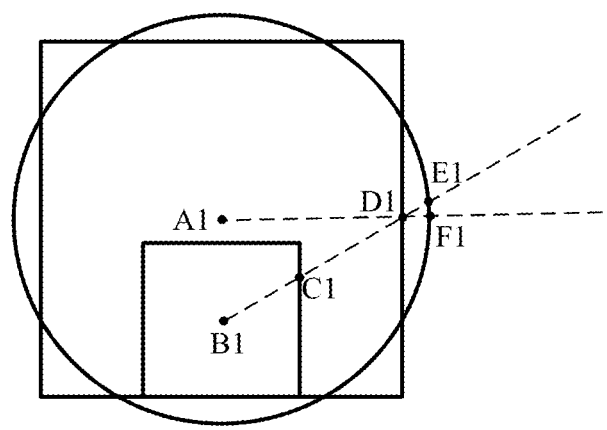
FIG. 19 is a comparison diagram of mapping modes of an asymmetric cubemap according to some embodiments of the disclosure.

Referring to FIG. 19, a comparison between the aforementioned two kinds of asymmetric cubemap mapping is made to see the difference therebetween. The first mode is first mapping to a point D1 on a surface of an ordinary cubemap through the central point B1 of an asymmetric cubemap, and then finding a point F1 on a surface of a sphere model corresponding to the point D1 through the central point A1 of the ordinary cubemap. The second mode is directly mapping from the central point B1 of an asymmetric cubemap to a point E1 on a surface of a sphere model. The two asymmetric cubemap mapping methods are different, and the positions of the point E1 and the point F1 obtained on the surface of the sphere model are different.

The two modes have different mapping effects. In the second mode, since mapping is directly performed between the surface of the sphere model and the surface of the asymmetric cubemap at the offset position, certain nonlinear bending occurs in the mapping result.

Figure 20:
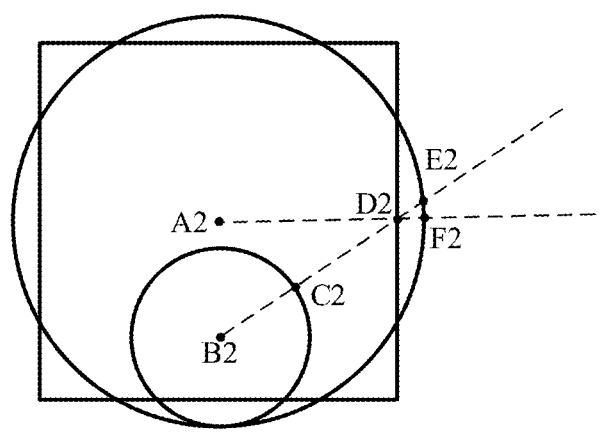
FIG. 20 is a comparison diagram of mapping modes of an asymmetric sphere model according to some embodiments of the disclosure.

FIG. 20 illustrates another stretching mode. The asymmetric cubemap is changed to an asymmetric sphere model. A one-to-one mapping relationship is found between an asymmetric sphere model and an original ordinary sphere model in FIG. 20. A plurality of mapping modes may exist.

The first mode is mapping to a point D2 on a surface of an ordinary cubemap through the central point B2 of the asymmetric sphere model. The second mode is first mapping to a point D2 on a surface of an ordinary cubemap through the central point B2 of the asymmetric sphere model. Then a point F2 on a surface of an ordinary sphere model corresponding to the point D2 is found through the central point A2 of the ordinary cubemap. The third mode is directly mapping from the central point B2 of an asymmetric sphere model to a point E2 on a surface of a sphere model. The positions of the point E2 and the point F2 obtained on the surface of the ordinary sphere model are also different in the second and third modes.

The principle of a cubemap to 2D stretching is introduced below.

A side length of an ordinary cubemap may be calculated according to an inputted original image. For example, an aspect ratio of the inputted original image is 2:1, and the side length of the ordinary cubemap can be calculated according to the inputted original image. Referring to FIG. 11, CD is the side length of an ordinary cubemap, and the side length is denoted as Lcd, where Lcd is equal to the width of the original image divided by 4. For example, if the size of the original image is 3840×1920, then Lcd=960.

Figure 12:
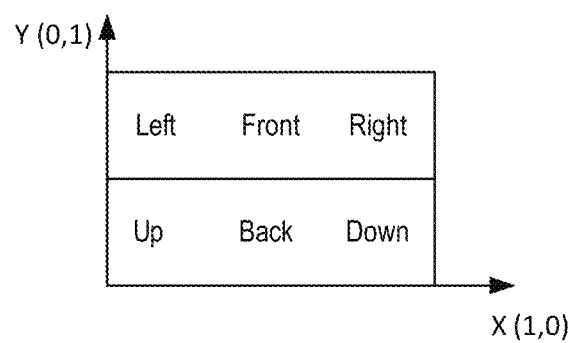
FIG. 12 is a schematic diagram illustrating the principle of asymmetric cubemap mapping and stretching.

A side length of an asymmetric cubemap may be calculated according to the side length of the ordinary cubemap and an absolute value L of the offset. Referring to FIG. 11, GH is a side length of the cube of the asymmetric cubemap model, and the side length is denoted as Lgh. As shown in FIG. 11, Lgh=Lcd(1−2|offset|). As shown in FIG. 12, the width of a rectangle of a 2D stretched plane map is 3×Lgh, and the height is 2×Lgh.

The principle of asymmetric cubemap mapping and stretching is illustrated below using an example.

Assume that the BD direction in FIG. 10 is the same as the Z-axis, and L is ¼ of the length of AB. As shown in FIG. 10, the mapping between a 3D position (qx, qy, qz) of the ordinary cubemap ABCDA'B'C'D' and a 2D position of the asymmetric cubemap after stretching may be obtained through the following equation.

TABLE 1

Mapping between ordinary cubemap and asymmetric cubemap

| (qx, qy, qz) | (qx', qy', qz') |
|---|---|
| (qx', qy', 2*qz' −0.5) | qz' > 0.25, qz' >= 0.5*|qy'| + 0.25, qz' >= 0.5*|qx'| + 0.25 |
| (qx', qy', (4*qz' −1)/6) | qz' < 0.25, qz' <= −1.5*|qx'| + 0.25, qz' <= −1.5*|qy'| + 0.25 |
| (qx', qy', qz' +0.5*qx' −0.25) | qx' > 0, qx' >= |qy'|, qx' >= 2*qz' −0.5, 1.5*qx' >= 0.25 − qz' |
| (qx', qy', qz' −0.5*qx' −0.25) | qx' < 0, qx' <= −|qy'|, qx', <= 0.5−2*qz', 1.5*qx' <= qz' −0.25 |
| (qx', qy', qz' +0.5*qy' −0.25) | qy' > 0, qy' >= |qx'|, qy' >= 2*qz' −0.5, 1.5*qy' >= 0.25 − qz' |
| (qx', qy', qz' −0.5*qy' −0.25) | qy' < 0, qy' <= −|qx'|, qy' <= −2*qz' +0.5, 1.5*qy' <= qz' −0.25 |

TABLE 2

Mapping between 3D asymmetric cubemap and 2D stretched graph

| (qx', qy', qz') | (x, y) |
|---|---|
| (0.5 − 2*y, 0.5, 0.5 − 3*x − offset) | ⅓ > x >= 0, ½ > y >= 0 |
| (0.5 − 2*y, 1.5 − 3*x, −0.5 − offset) | ⅔ > x >= ⅓, ½ > y >= 0 |

TABLE 2-continued

Mapping between 3D asymmetric cubemap and 2D stretched graph

| (qx', qy', qz') | (x, y) |
|---|---|
| (0.5 − 2*y, −0.5, 3*x − 2.5 − offset) | 1 > x >= ⅔, ½ > y >= 0 |
| (−0.5, 2*y − 1.5, 3*x − 0.5 − offset) | ⅓ > x >= 0, 1 > y >= ½ |
| (3*x − 1.5, 2*y − 1.5, 0.5 − offset) | ⅔ > x >= ⅓, 1 > y >= ½ |
| (0.5, 2*y − 1.5, 2.5 − 3*x − offset) | 1 > x >= ⅔, 1 > y >= ½ |

In the equations of Table 1 and Table 2 above, (x, y) represent a coordinate in the 2D stretched graph; x and y are normalized, and x and y are both normalized to be between 0 and 1; please refer to FIG. 12. (qx', qy', qz') is corresponding 3D coordinates in the asymmetric cubemap GHIJG'H'I'J'. (qx, qy, qz) is corresponding 3D coordinates in the cubemap ABCDA'B'C'D'. In Equation 1 and Equation 2, polar coordinates (θ, φ) are calculated according to (qx, qy, qz), obtaining a corresponding pixel position of an inputted 3D model map subjected to equirectangular mapping.

$$\theta = -\arctan(-qx/d, qz/d)/(2\times\pi)+0.5 \quad \text{Equation 1}$$

$$\varphi = \arcsin(-qy/d)/\pi+0.5 \quad \text{Equation 2}$$

d=√qx×qx+qy×qy+qz×qz, where d is the length of (qx, qy, qy), indicating normalization of (qx, qy, qy), (θ, φ) is polar coordinates of a sphere model. (qx, qy, qy) is 3D coordinates of the ordinary cubemap. (qx', qy', qy') is 3D coordinates of the asymmetric cubemap. The arctan represents an arc cotangent function; the arcsin represents an arc sine function.

Mapping between the inputted coordinates (θ, φ) and the output coordinates (x,y) may be obtained using the aforementioned Table 1, Table 2, Equation 1, and Equation 2.

In the example above, the length of L is set to ¼ of the length of AB, and L is set in the direction of the Z-axis. However, those skilled in the art can understand that L may be any other length, and the inputted 3D model map may be mapped into an asymmetric cubemap in any direction. In this way, a plurality of asymmetric cubemap mapping channels can be generated for dynamic streams.

In addition, the resolution of the output mapping is based on the length of L. For example, if L=¼*AB, then the resolution of the outputted asymmetric cubemap will be ¼ of the resolution the ordinary cubemap. In this case, the resolution of the ROI region of GH is maintained and the FOV (field of view) of the ROI is [−45°, +45°]. The advantage of the asymmetric cubemap mapping is that the image quality deteriorates very slowly over a wider range as compared with pyramid mapping. Based on this advantage, fewer mapping channels (as compared with the number of mapping channels of the pyramid) can be generated for dynamic streams. Meanwhile, the image quality is also improved when view switching occurs.

As shown in FIG. 9 and FIG. 10, the asymmetric cubemap mapping has high mapping resolution of a field of view of 90 degrees at the side CD and low mapping resolution of a field of view of 90 degrees at the side AB. Thus, in practice, multi-channel asymmetric cubemap mapping may be performed to enable a user to experience high resolution from different fields of view. Typically, the user may perform asymmetric cubemap mapping six times in six directions including up, down, left, right, front, and back of the mapping center of the asymmetric cubemap.

Figure 13:
FIG. 13 is a schematic diagram of a mapping result of a frame of a test video in an example of the disclosed embodiments.

FIG. 13 is a schematic diagram of a mapping result of a frame of a test video in an example of the disclosed embodiments. The test video is subjected to asymmetric cubemap mapping according to the image processing method in the aforementioned embodiments and stretched in the stretching mode of FIG. 12, obtaining a clear display effect shown in FIG. 13.

According to the approach of mapping an inputted 3D model map into an asymmetric cubemap in the disclosure, an inputted 3D model map can be mapped into an asymmetric cubemap and the asymmetric cube can be stretched into a 2D plane, maintaining high image resolution in an ROI, for example, a primary field of view, of the user. Moreover, the solution slowly deteriorates at positions away from the ROI of the user, thereby reducing the overall resolution of the 2D stretched plane map. As compared with the pyramid mapping mode, the image quality in the present disclosure deteriorates very slowly over a wider range, thereby compensating for the weakness of the currently universal pyramid mapping mode.

Figure 14A:
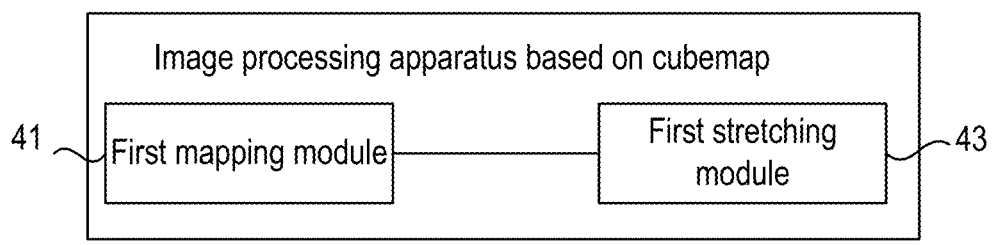
FIG. 14A is a block diagram of an image processing apparatus based on a cubemap according to some embodiments of the disclosure.

FIG. 14A is a block diagram of an image processing apparatus based on a cubemap according to some embodiments of the disclosure. As shown in FIG. 14A, the image processing apparatus based on a cubemap includes: a first mapping module 41, configured to map an inputted 3D model map into an asymmetric cubemap, the asymmetric cubemap located at a different place than the mapping center of the inputted 3D model map; and a first stretching module 43, configured to stretch the asymmetric cubemap mapped for the inputted 3D model map into a 2D stretched plane map.

Figure 14B:
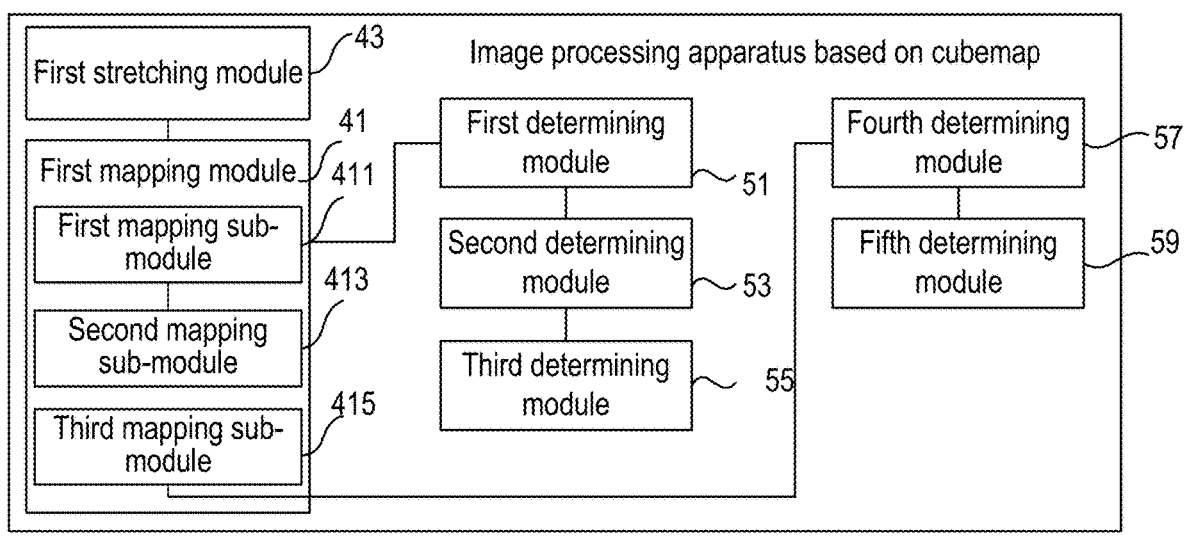
FIG. 14B is a block diagram of an image processing apparatus based on a cubemap according to some embodiments of the disclosure.

In one implementation, as shown in FIG. 14B, the first mapping module 41 includes: a first mapping sub-module 411, configured to perform mapping from the center of the asymmetric cubemap so that pixels on a surface of the inputted 3D model map correspond to pixels on a surface of the asymmetric cubemap, the inputted 3D model map being an ordinary cubemap, and the asymmetric cubemap located at a different place than the mapping center of the ordinary cubemap.

In one implementation, as shown in FIG. 14B, the first mapping module 41 further includes: a second mapping sub-module 413, configured to perform mapping from the center of the ordinary cubemap so that pixels on a surface of the inputted 3D model map correspond to pixels on a surface of the ordinary cubemap, the inputted 3D model map being a sphere model, and the ordinary cubemap located at the same place as the mapping center of the sphere model; and perform mapping from the center of the asymmetric cubemap so that the pixels on the surface of the ordinary cubemap correspond to pixels on a surface of the asymmetric cubemap, the asymmetric cubemap located at a different place than the mapping center of the ordinary cubemap.

In one implementation, as shown in FIG. 14B, the first mapping module 41 further includes: a third mapping sub-module 415, configured to perform mapping from the center of the asymmetric cubemap so that pixels on a surface of the inputted 3D model map correspond to pixels on a surface of the asymmetric cubemap, the inputted 3D model map being a sphere model, and the asymmetric cubemap located at a different place than the mapping center of the sphere model.

In one implementation, the first stretching module 43 is further configured to make the pixels on the surface of the asymmetric cubemap correspond to pixels of the 2D stretched plane map.

In one implementation, as shown in FIG. 14B, the apparatus further includes: a first determining module 51, configured to determine a first mapping relationship between 3D coordinates of the ordinary cubemap and 3D coordinates of the asymmetric cubemap according to an offset between the asymmetric cubemap and the mapping center of the ordinary cubemap; and a second determining module 53, configured to determine a second mapping relationship between the 3D coordinates of the asymmetric cubemap and 2D coordinates of the 2D stretched plane map according to the offset between the asymmetric cubemap and the mapping center of the ordinary cubemap.

In one implementation, as shown in FIG. 14B, the apparatus further includes: a third determining module 55, configured to determine a third mapping relationship between polar coordinates of the sphere model and 3D coordinates of the ordinary cubemap.

In one implementation, as shown in FIG. 14B, the apparatus further includes: a fourth determining module 57, configured to determine a fourth mapping relationship between 3D coordinates of the asymmetric cubemap and polar coordinates of the sphere model according to an offset between the asymmetric cubemap and the mapping center of the sphere model; and a fifth determining module 59, configured to determine a fifth mapping relationship between the 3D coordinates of the asymmetric cubemap and 2D coordinates of the 2D stretched plane map according to the offset between the asymmetric cubemap and the mapping center of the sphere model.

Figure 15A:
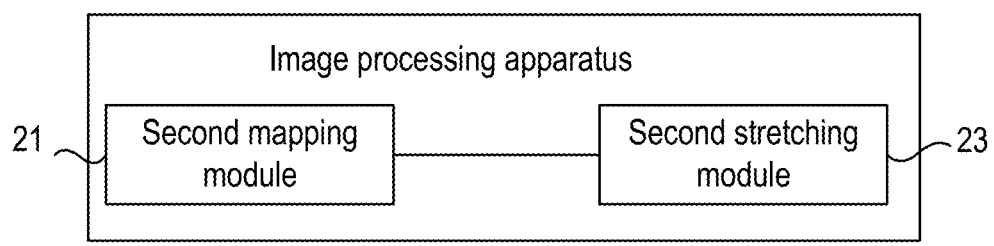
FIG. 15A is a block diagram of an image processing apparatus according to some embodiments of the disclosure.

FIG. 15A is a block diagram of an image processing apparatus according to some embodiments of the disclosure. As shown in FIG. 15A, the image processing apparatus includes: a second mapping module 21, configured to map an inputted 3D model map into an asymmetric sphere model, the asymmetric sphere model located at a different place than the mapping center of the inputted 3D model map; and a second stretching module 23, configured to stretch the asymmetric sphere model mapped for the inputted 3D model map into a 2D stretched plane map.

Figure 15B:
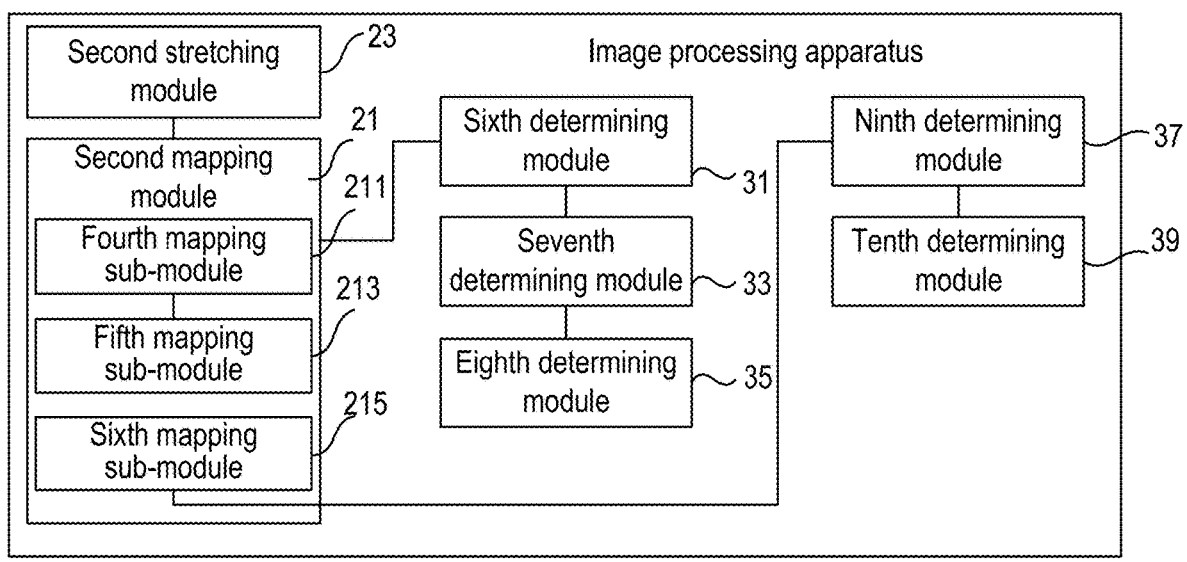
FIG. 15B is a block diagram of the image processing apparatus according to some embodiments of the disclosure.

In one implementation, as shown in FIG. 15B, the second mapping module 21 includes: a fourth mapping sub-module 211, configured to perform mapping from the center of the asymmetric sphere model so that pixels on a surface of the inputted 3D model map correspond to pixels on a surface of the asymmetric sphere model, the inputted 3D model map being an ordinary cubemap, and the asymmetric sphere model located at a different place than the mapping center of the ordinary cubemap.

In one implementation, the second mapping module 21 further includes: a fifth mapping sub-module 213, configured to perform mapping from the center of the ordinary cubemap so that pixels on a surface of the inputted 3D model map correspond to pixels on a surface of the ordinary cubemap, the inputted 3D model map being an ordinary sphere model, and the ordinary cubemap located at the same place as the mapping center of the ordinary sphere model; and perform mapping from the center of the asymmetric sphere model so that pixels on a surface of the ordinary cubemap correspond to pixels on a surface of the asymmetric sphere model, the asymmetric sphere model located at a different place than the mapping center of the ordinary cubemap.

In one implementation, the second mapping module 21 further includes: a sixth mapping sub-module 215, configured to perform mapping from the center of the asymmetric sphere model so that pixels on a surface of the inputted 3D model map correspond to pixels on a surface of the asymmetric sphere model, the inputted 3D model map being an ordinary sphere model, and the asymmetric sphere model located at a different place than the mapping center of the ordinary sphere model.

In one implementation, the second stretching module 23 is further configured to make the pixels on the surface of the asymmetric sphere model correspond to pixels of the 2D stretched plane map.

In one implementation, the apparatus further includes: a sixth determining module 31, configured to determine a sixth mapping relationship between 3D coordinates of the ordinary cubemap and polar coordinates of the asymmetric sphere model according to an offset between the asymmetric sphere model and the mapping center of the ordinary cubemap; and a seventh determining module 33, configured to determine a seventh mapping relationship between the polar coordinates of the asymmetric sphere model and 2D coordinates of the 2D stretched plane map according to the offset between the asymmetric sphere model and the mapping center of the ordinary cubemap.

In one implementation, the apparatus further includes: an eighth determining module 35, configured to determine an eighth mapping relationship between polar coordinates of the ordinary sphere model and 3D coordinates of the ordinary cubemap.

In one implementation, the apparatus further includes: a ninth determining module 37, configured to determine a ninth mapping relationship between polar coordinates of the asymmetric sphere model and polar coordinates of the ordinary sphere model according to an offset between the asymmetric sphere model and the mapping center of the ordinary sphere model; and a tenth determining module 39, configured to determine a tenth mapping relationship between the polar coordinates of the asymmetric sphere model and 2D coordinates of the 2D stretched plane map according to the offset between the asymmetric sphere model and the mapping center of the ordinary sphere model.

Figure 16A:
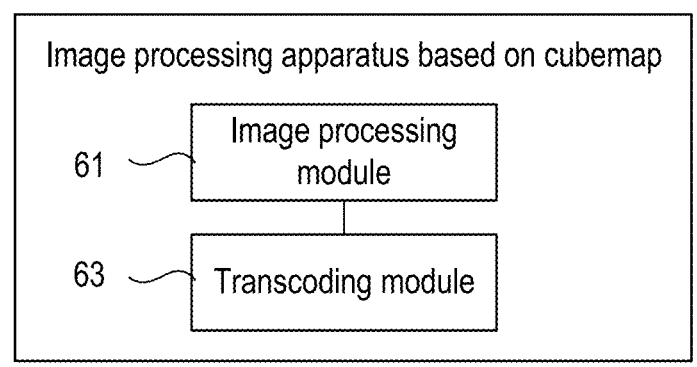
FIGS. 16A and 16B are block diagrams of image processing apparatuses according to some embodiments of the disclosure.

FIG. 16A is a block diagram of an image processing apparatus according to some embodiments of the disclosure. As shown in FIG. 16A, the apparatus includes: an image processing module 61, configured to map and stretch an inputted 3D model map by using the image processing apparatus according to the aforementioned embodiment, obtaining a 2D stretched plane map; and a transcoding module 63, configured to transcode the 2D stretched plane map.

Figure 16B:
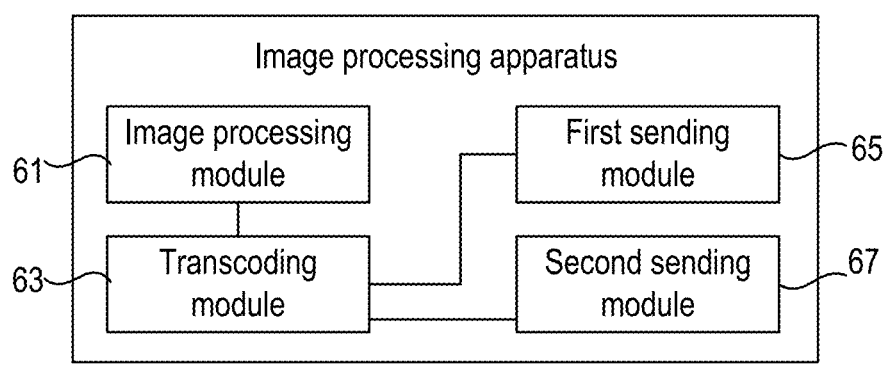

In another embodiment, as shown in FIG. 16B, an image processing apparatus is further provided. The apparatus includes the image processing module 61 and the transcoding module 63, and further includes: a first sending module 65, configured to send a transcoded image to a client; and a second sending module 67, configured to send to the client an offset between an asymmetric cubemap and the mapping center of the inputted 3D model map, so that the client performs rendering according to the transcoded image and the offset.

Figure 17:
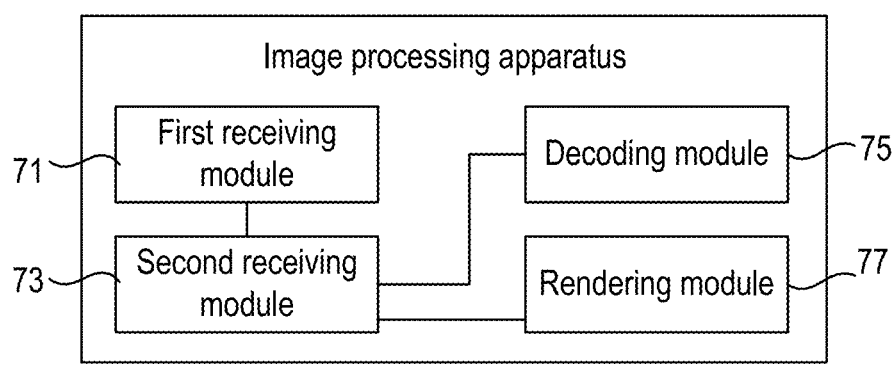
FIG. 17 is a block diagram of an image processing apparatus according to some embodiments of the disclosure.

FIG. 17 is a block diagram of an image processing apparatus according to some embodiments of the disclosure. As shown in FIG. 17, the apparatus includes: a first receiving module 71, configured to receive a transcoded image; a second receiving module 73, configured to receive an offset, the offset being an offset between an asymmetric cubemap at a transcoding end and the mapping center of an inputted 3D model map, and the asymmetric cubemap located at a different place than the mapping center of the inputted 3D model map; a decoding module 75, configured to decode the received image; and a rendering module 77, configured to render the decoded image according to the offset.

In one implementation, the rendering module 77 includes any one of the following sub-modules: a first rendering sub-module, configured to perform ordinary cubemapping on the decoded image, and render the ordinary cubemap according to the offset; or a second rendering sub-module, configured to reversely map the decoded image into an ordinary cubemap according to the offset, and render the ordinary cubemap; or a third rendering sub-module, configured to reversely map the decoded image into a sphere model according to the offset, and render the sphere model.

An embodiment of the present disclosure provides a system for processing a panoramic video image. The system for processing a panoramic video image may be applied to a transcoding end. The system may include: the image processing apparatus based on cubemap mapping according to the aforementioned embodiment. The image processing apparatus based on cubemap mapping is configured to process a panoramic video image in at least one selected direction to obtain at least one video stream corresponding to the at least one direction.

Figure 18:
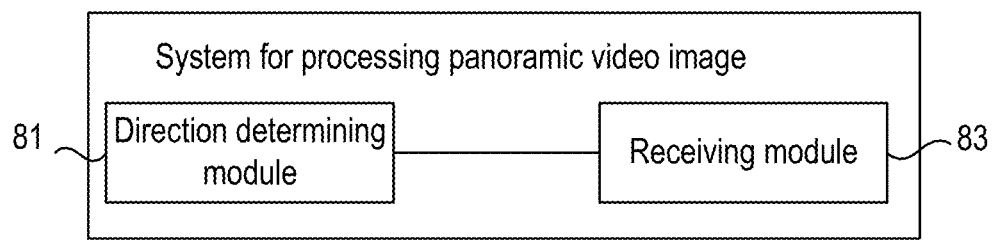
FIG. 18 is a block diagram of a system for processing a panoramic video image according to some embodiments of the disclosure.

FIG. 18 is a block diagram of a system for processing a panoramic video image according to some embodiments of the disclosure. As shown in FIG. 18, the system for processing a panoramic video image may be applied to a transcoding end. The system may include: a direction determining module 81, configured to determine a target direction of a field of view of a user; and a receiving module 83, configured to receive a video stream corresponding to the target direction and obtained by using the system for processing a panoramic video image according to the aforementioned embodiment.

The specific manners of performing operations by the modules in the apparatus in the aforementioned embodiment have been described in detail in the embodiment related to the method, and are not illustrated in detail herein.

The present disclosure may be a system, a method, or a computer program product. The computer program product may include a computer-readable storage medium having computer-readable program instructions carried thereon for causing a processor to implement various aspects of the present disclosure.

The computer-readable storage medium may be a tangible device that can hold and store instructions used by an instruction execution device. The computer-readable storage medium may be, for example, but is not limited to, an electrical storage device, a magnetic storage device, an optical storage device, an electromagnetic storage device, a semiconductor storage device, or any suitable combination thereof. More specific examples of the computer-readable storage medium (a non-exhaustive list) include a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanical encoding device, such as a punch card with instructions stored thereon or a structure of bumps within recessions, and any suitable combination thereof. The computer-readable storage medium used herein as transient signals themselves, such as radio waves or other freely propagated electromagnetic waves, electromagnetic waves propagated through a waveguide or other transmission media (for example, light pulses passing through a fiber optic cable), or electrical signals transmitted through electric wires.

The computer-readable program instructions described herein may be downloaded from a computer-readable storage medium to various computing/processing devices or downloaded to an external computer or external storage device via a network such as the Internet, a local area network, a wide area network, and/or a wireless network. The network may include copper transmission cables, fiber transmission, wireless transmission, routers, firewalls, switches, gateway computers, and/or edge servers. A network adapter card or a network interface in each computing/processing device receives computer-readable program instructions from the network and forwards the computer-readable program instructions, for storing them in a computer-readable storage medium in each computing/processing device.

Computer program instructions for performing the operations of the present disclosure can be assembly instructions, instruction set architecture (ISA) instructions, machine instructions, machine related instructions, microcode, firmware instructions, state setting data, or source code or object code written in any combination of one or a plurality of programming languages, the programming language including object oriented programming languages such as Smalltalk and C++, and conventional procedural programming languages such as "C" language or similar programming languages. The computer-readable program instructions may be executed entirely or partly on a user computer, executed as a stand-alone software package, executed partly on a user computer and partly on a remote computer, or executed entirely on a remote computer or server. In the case of a remote computer, the remote computer may be connected to the user computer through any kind of network, including a local area network (LAN) or a wide area network (WAN). Alternatively, it may be connected to an external computer (for example, using an Internet service provider to connect via the Internet). In some embodiments, electronic circuits, such as programmable logic circuits, field programmable gate arrays (FPGAs), or programmable logic arrays (PLAs), are customized by utilizing state information of computer-readable program instructions. The electronic circuits can execute computer-readable program instructions to implement various aspects of the present disclosure.

The aspects of the present disclosure are described herein with reference to the flowcharts and/or block diagrams of the methods, apparatuses (systems), and computer program products according to the embodiments of the present disclosure. It should be understood that each block of the flowcharts and/or block diagrams and combinations of various blocks in the flowcharts and/or block diagrams can be implemented by computer-readable program instructions.

These computer-readable program instructions may be provided to a processor of a general-purpose computer, a special-purpose computer, or other programmable data processing apparatuses, to produce a machine, so that these instructions, when executed by the processor of the computer or other programmable data processing apparatuses, produce an apparatus for implementing the functions/actions specified in one or a plurality of blocks of the flowcharts and/or block diagrams. Also, these computer-readable program instructions may be stored in a computer-readable storage medium. These instructions cause a computer, a programmable data processing apparatus, and/or other devices to work in a specific manner; thus, the computer-readable medium storing the instructions includes an artifact, including instructions that implement various aspects of the functions/actions specified in one or a plurality of blocks of the flowcharts and/or block diagrams.

The computer-readable program instructions may also be loaded onto a computer, other programmable data processing apparatuses, or other devices, such that the computer, other programmable data processing apparatuses or other devices perform a series of operational steps, to generate a computer-implemented process, such that the functions/actions specified in one or a plurality of blocks of the flowcharts and/or block diagrams are implemented by the instructions executed on the computer, other programmable data processing apparatuses, or other devices.

The flowcharts and block diagrams in the accompanying drawings illustrate architectures, functions, and operations of implementations of the system, method, and computer program product according to a plurality of embodiments of the present disclosure. In this regard, each block in the flowcharts or block diagrams may represent a portion of a module, program segment, or instruction that contains one or a plurality of executable instructions for implementing the specified logical functions. In some alternative implementations, the functions denoted in the blocks can also occur in a different order than that illustrated in the drawings. For example, two consecutive blocks can actually be performed substantially in parallel, sometimes can also be performed in a reverse order, depending upon the functions involved. It is also noted that each block of the block diagrams and/or flowcharts, and combinations of blocks in the block diagrams and/or flowcharts may be implemented in a dedicated hardware-based system that performs the specified function or action, or may be implemented by a combination of dedicated hardware and computer instructions.

The embodiments of the present disclosure have been described above. The foregoing description is illustrative rather than exhaustive, and is not limited to the disclosed embodiments. Many modifications and variations are apparent to those of ordinary skill in the art without departing from the scope and spirit of the embodiments illustrated. The selection of terms used herein is intended to best explain the principles, practical applications, or technical improvements to the techniques in the market of the embodiments, or to enable others of ordinary skill in the art to understand the embodiments disclosed herein.

The invention claimed is:

1. A method comprising:
    mapping a three-dimensional (3D) model map into an asymmetric cubemap, the 3D model map including a center and at least one surface of a three-dimensional solid positioned along a ray extending from the center, a center of the asymmetric cubemap located at a different position than the center of the 3D model map; and
    stretching the asymmetric cubemap into a two-dimensional (2D) stretched plane map.

2. The method of claim 1, the mapping the 3D model map comprising: performing a second mapping from the center of the asymmetric cubemap, the second mapping causing pixels on a surface of the 3D model map to correspond to pixels on a surface of the asymmetric cubemap, the 3D model map comprising an ordinary cubemap.

3. The method of claim 2, the stretching the asymmetric cubemap comprising making the pixels on the surface of the asymmetric cubemap correspond to pixels of the 2D stretched plane map.

4. The method of claim 2, further comprising:
    determining a first mapping relationship between 3D coordinates of the ordinary cubemap and 3D coordinates of the asymmetric cubemap based on an offset between the asymmetric cubemap and the mapping center of the ordinary cubemap; and
    determining a second mapping relationship between the 3D coordinates of the asymmetric cubemap and 2D coordinates of the 2D stretched plane map based on the offset between the asymmetric cubemap and the mapping center of the ordinary cubemap.

5. The method of claim 1, the mapping the 3D model map further comprising:
    performing a second mapping from the center of an ordinary cubemap, the second mapping causing pixels on a surface of the 3D model map to correspond to pixels on a surface of the ordinary cubemap, the 3D model map comprising a sphere model; and
    performing a third mapping from the center of the asymmetric cubemap, the third mapping causing the pixels on the surface of the ordinary cubemap to correspond to pixels on a surface of the asymmetric cubemap.

6. The method of claim 1, the mapping the 3D model map comprising performing a second mapping from the center of the asymmetric cubemap, the second mapping causing pixels on a surface of the 3D model map to correspond to pixels on a surface of the asymmetric cubemap, the 3D model map being a sphere model.

7. The method of claim 6, further comprising:
    determining a fourth mapping relationship between 3D coordinates of the asymmetric cubemap and polar coordinates of the sphere model based on an offset between the asymmetric cubemap and the mapping center of the sphere model; and
    determining a fifth mapping relationship between the 3D coordinates of the asymmetric cubemap and 2D coordinates of the 2D stretched plane map based on the offset between the asymmetric cubemap and the mapping center of the sphere model.

8. The method of claim 1, further comprising transcoding the 2D stretched plane map.

9. The method of claim 8, further comprising:
    sending a transcoded image to a client; and
    sending to the client an offset between an asymmetric cubemap and the mapping center of the 3D model map, the sending of the offset causing the client to perform a rendering based on the transcoded image and the offset.

10. A non-transitory computer readable storage medium for tangibly storing computer program instructions capable of being executed by a computer processor, the computer program instructions defining the steps of:
    mapping a three-dimensional (3D) model map into an asymmetric cubemap, the 3D model map including a center and at least one surface of a three-dimensional solid positioned along a ray extending from the center, a center of the asymmetric cubemap located at a different position than the center of the 3D model map; and
    stretching the asymmetric cubemap into a two-dimensional (2D) stretched plane map.

11. The non-transitory computer readable storage medium of claim 10, the mapping the 3D model map comprising:

performing a second mapping from the center of the asymmetric cubemap, the second mapping causing pixels on a surface of the 3D model map to correspond to pixels on a surface of the asymmetric cubemap, the 3D model map comprising an ordinary cubemap.

12. The non-transitory computer readable storage medium of claim 11, the stretching the asymmetric cubemap comprising making the pixels on the surface of the asymmetric cubemap correspond to pixels of the 2D stretched plane map.

13. The non-transitory computer readable storage medium of claim 11, the computer program instructions further defining the steps of:
   determining a first mapping relationship between 3D coordinates of the ordinary cubemap and 3D coordinates of the asymmetric cubemap based on an offset between the asymmetric cubemap and the mapping center of the ordinary cubemap; and
   determining a second mapping relationship between the 3D coordinates of the asymmetric cubemap and 2D coordinates of the 2D stretched plane map based on the offset between the asymmetric cubemap and the mapping center of the ordinary cubemap.

14. The non-transitory computer readable storage medium of claim 10, the mapping the 3D model map further comprising:
   performing a second mapping from the center of an ordinary cubemap, the second mapping causing pixels on a surface of the 3D model map to correspond to pixels on a surface of the ordinary cubemap, the 3D model map comprising a sphere mode; and
   performing a third mapping from the center of the asymmetric cubemap, the third mapping causing the pixels on the surface of the ordinary cubemap to correspond to pixels on a surface of the asymmetric cubemap.

15. The non-transitory computer readable storage medium of claim 10, the mapping the 3D model map comprising performing a second mapping from the center of the asymmetric cubemap, the second mapping causing pixels on a surface of the 3D model map to correspond to pixels on a surface of the asymmetric cubemap, the 3D model map being a sphere model.

16. The non-transitory computer readable storage medium of claim 15, the computer program instructions further defining the steps of:
   determining a fourth mapping relationship between 3D coordinates of the asymmetric cubemap and polar coordinates of the sphere model based on an offset between the asymmetric cubemap and the mapping center of the sphere model; and
   determining a fifth mapping relationship between the 3D coordinates of the asymmetric cubemap and 2D coordinates of the 2D stretched plane map based on the offset between the asymmetric cubemap and the mapping center of the sphere model.

17. The non-transitory computer readable storage medium of claim 10, the computer program instructions further defining the steps of transcoding the 2D stretched plane map.

18. The non-transitory computer readable storage medium of claim 17, the computer program instructions further defining the steps of:
   sending a transcoded image to a client; and
   sending to the client an offset between an asymmetric cubemap and the mapping center of the 3D model map, the sending of the offset causing the client to perform a rendering based on the transcoded image and the offset.

19. An apparatus comprising:
   a processor; and
   a storage medium for tangibly storing thereon program logic for execution by the processor, the stored program logic comprising instructions causing the processor to perform the operations of:
      mapping a three-dimensional (3D) model map into an asymmetric cubemap, the 3D model map including a center and at least one surface of a three-dimensional solid positioned along a ray extending from the center, a center of the asymmetric cubemap located at a different position than the center of the 3D model map; and
      stretching the asymmetric cubemap into a two-dimensional (2D) stretched plane map.

20. The apparatus of claim 19, the stored program logic comprising instructions causing the processor to perform the operations of:
   transcoding the 2D stretched plane map;
   sending a transcoded image to a client; and
   sending to the client an offset between an asymmetric cubemap and the mapping center of the 3D model map, the sending of the offset causing the client to perform a rendering based on the transcoded image and the offset.

* * * * *